United States Patent [19]
Arai

[11] Patent Number: 5,517,551
[45] Date of Patent: May 14, 1996

[54] TELEPHONE APPARATUS WITH DIAL KEY DISPLAY FOR EXTERNAL LINE STATUS

[75] Inventor: Shunji Arai, Yokohama, Japan

[73] Assignee: Canon Kabushiki Kaisha, Tokyo, Japan

[21] Appl. No.: 185,172

[22] Filed: Jan. 24, 1994

Related U.S. Application Data

[63] Continuation of Ser. No. 802,290, Dec. 4, 1991, abandoned.

[30] Foreign Application Priority Data

| Dec. 4, 1990 | [JP] | Japan | 2-400384 |
| Dec. 4, 1990 | [JP] | Japan | 2-400385 |
| Dec. 4, 1990 | [JP] | Japan | 2-400386 |
| Oct. 1, 1991 | [JP] | Japan | 3-253620 |

[51] Int. Cl.⁶ .................................................. H04Q 7/32
[52] U.S. Cl. .................... 379/58; 379/61; 379/156; 379/164; 379/396
[58] Field of Search ................... 379/58, 61, 156, 379/164, 165, 247, 377, 396, 214, 354, 376, 383

[56] References Cited

U.S. PATENT DOCUMENTS

| 3,906,168 | 9/1975 | McEowen | 379/376 |
| 4,538,028 | 8/1985 | Gazzoli et al. | 379/61 |
| 4,768,218 | 8/1988 | Yorita | 379/61 |
| 5,218,628 | 6/1993 | Ito | 379/58 |

FOREIGN PATENT DOCUMENTS

| 0233994 | 12/1983 | Japan | 379/164 |
| 0242096 | 10/1988 | Japan | 379/396 |

OTHER PUBLICATIONS

Telephony magazine advertisement for the "Delta 2464" telephone, 26 Dec. 1988.

*Primary Examiner*—Dwayne D. Bost
*Attorney, Agent, or Firm*—Fitzpatrick, Cella, Harper & Scinto

[57] ABSTRACT

A telephone apparatus comprises a display unit to display use states of a plurality of external lines; a dial key including a ten-key; and a selector to select either one of the external lines in accordance with the operation of the dial key. LEDs of two colors may be used as a display unit.

34 Claims, 21 Drawing Sheets

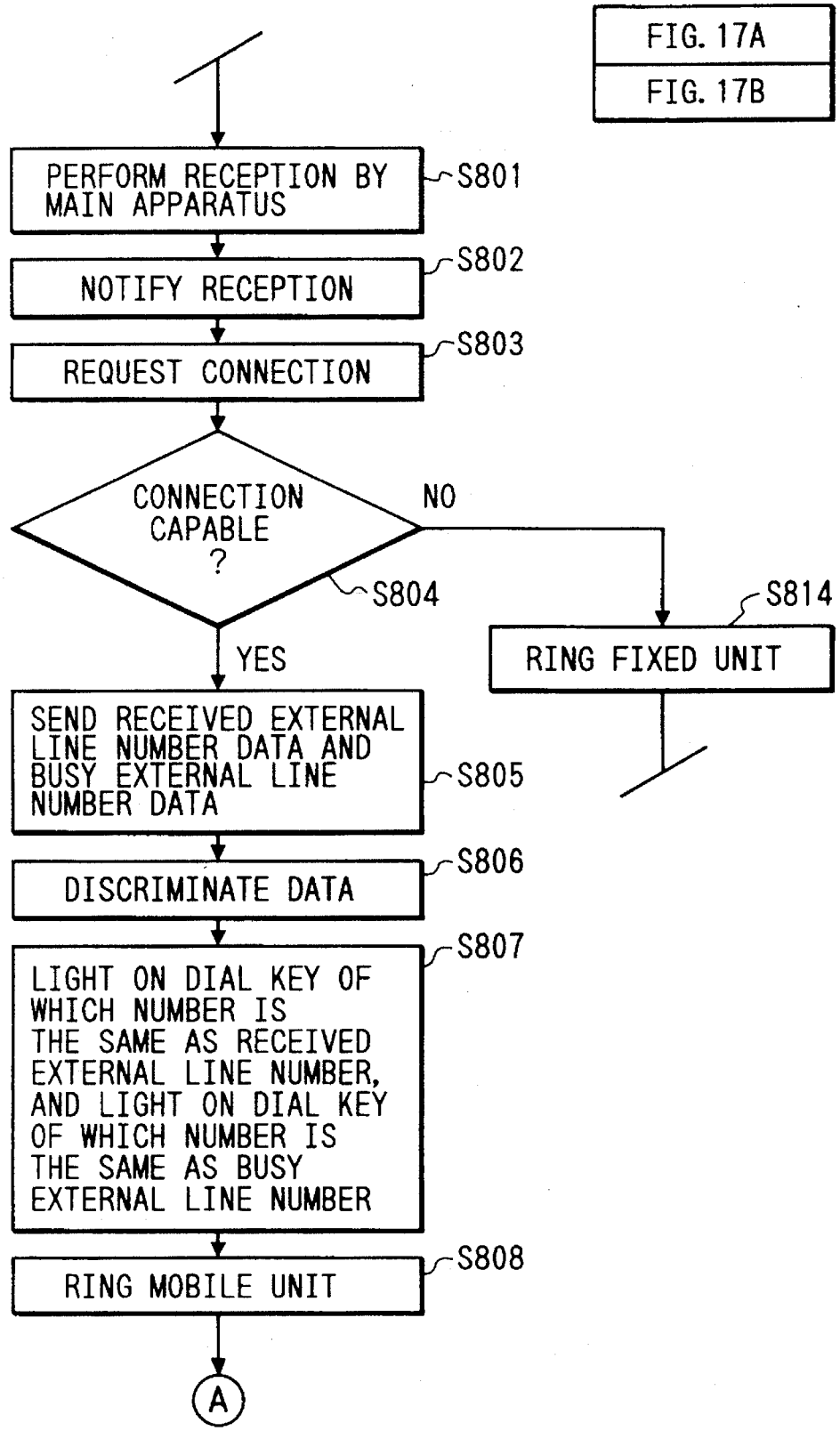

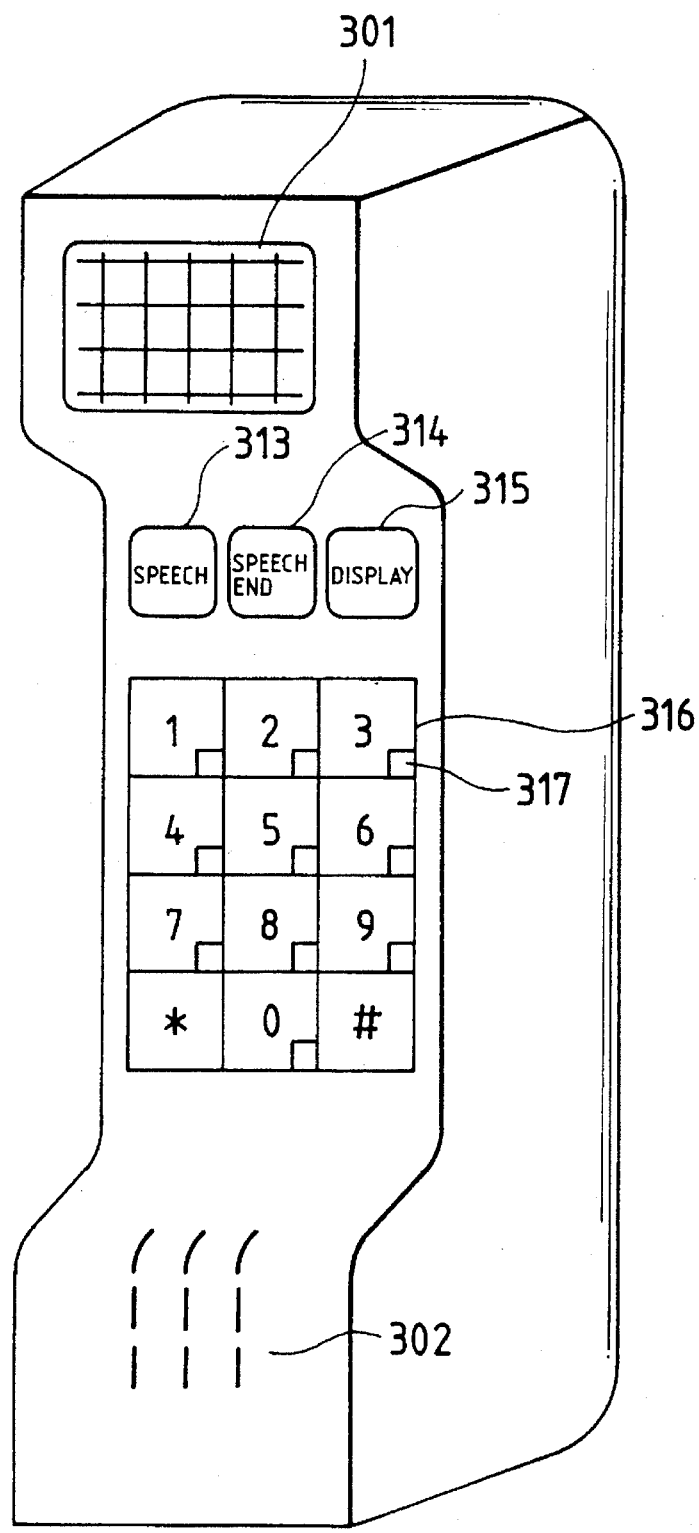

5,517,551

TELEPHONE APPARATUS WITH DIAL KEY DISPLAY FOR EXTERNAL LINE STATUS

This application is a continuation of application Ser. No. 07/802,290 filed Dec. 4, 1991, now abandoned.

BACKGROUND OF THE INVENTION

1. Field of the Invention

The invention relates to a telephone apparatus which can execute a speech communication via either one of a plurality of external lines.

2. Description of the Related Background Art

In conventional telephone exchanges, there is a telephone exchange in which in order to improve the operating efficiency when an external lines are transferred or the like, external buttons and external lamps in each for the same number of external lines are provided in an extension telephone and states of external lines are notified by the flickering of the selected external line lamp, color, or the like.

In the above conventional apparatus, however, there is a problem such that when the number of external lines to be enclosed in the extension telephone increases, the number of external line buttons and the number of external line lamps also increases, so that the operating efficiency deteriorates and an area of the operating section increases.

The above problem is particularly difficult in a slave cordless telephone.

SUMMARY OF THE INVENTION

It is an object of the invention to improve the operating efficiency when either one of a plurality of external lines is selected.

Another object of the invention is to miniaturize an operating section of a telephone.

Still another object of the invention is to miniaturize a slave cordless telephone.

Further another object of the invention is to provide a telephone which can select desired one of many external lines.

The above and other objects and features of the present invention will become apparent from the following detailed description and the appended claims with reference to the accompanying drawings.

BRIEF DESCRIPTION OF THE DRAWINGS

FIG. 20 is an external view of a mobile unit in another embodiment.

DETAILED DESCRIPTION OF THE PREFERRED EMBODIMENTS

Figure 1:
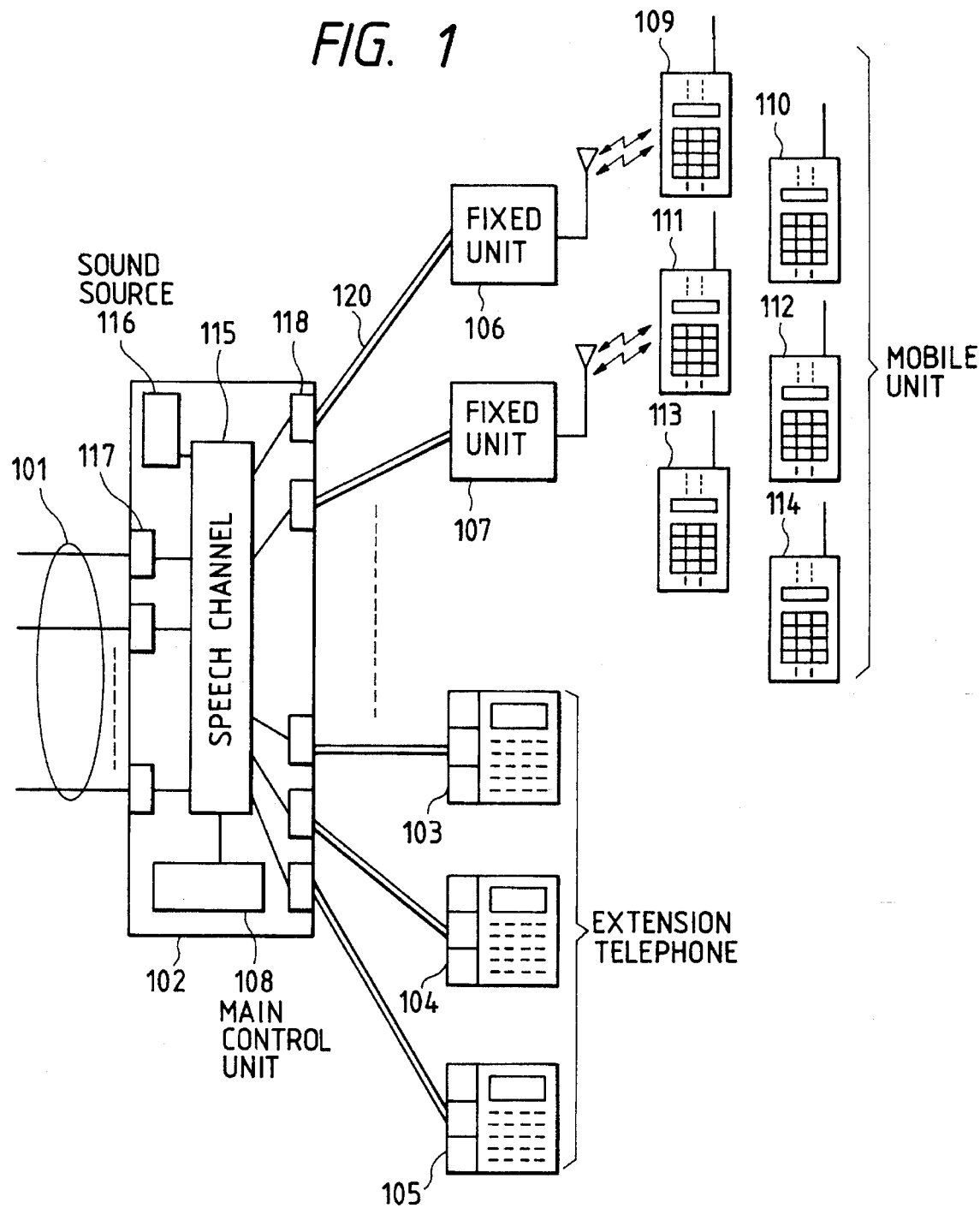
FIG. 1 is a system constructional diagram of the first embodiment.

FIG. 1 is a constructional diagram of a system embodying the invention. Reference numeral 101 denotes external lines such as PBX (private branch exchange) extensions, ordinary subscribers' lines, and the like; 102 a main apparatus which encloses therein a plurality of external lines and a plurality of extensions and has an exchange function; 108 a control unit of the main apparatus 102; 115 a speech channel; 116 a sound source; 117 an external line interface; 103 to 105 extension telephones connected to the main apparatus 102; 106 and 107 fixed units connected to the main apparatus 102; and 109 to 114 mobile units which are connected to the fixed units 106 and 107 in a wireless manner. The mobile units 109 and 110 correspond to the fixed unit 106. The mobile units 111 to 114 correspond to the fixed unit 107. Slave telephones can also be zone managed by the fixed units 106 and 107.

Figure 2:
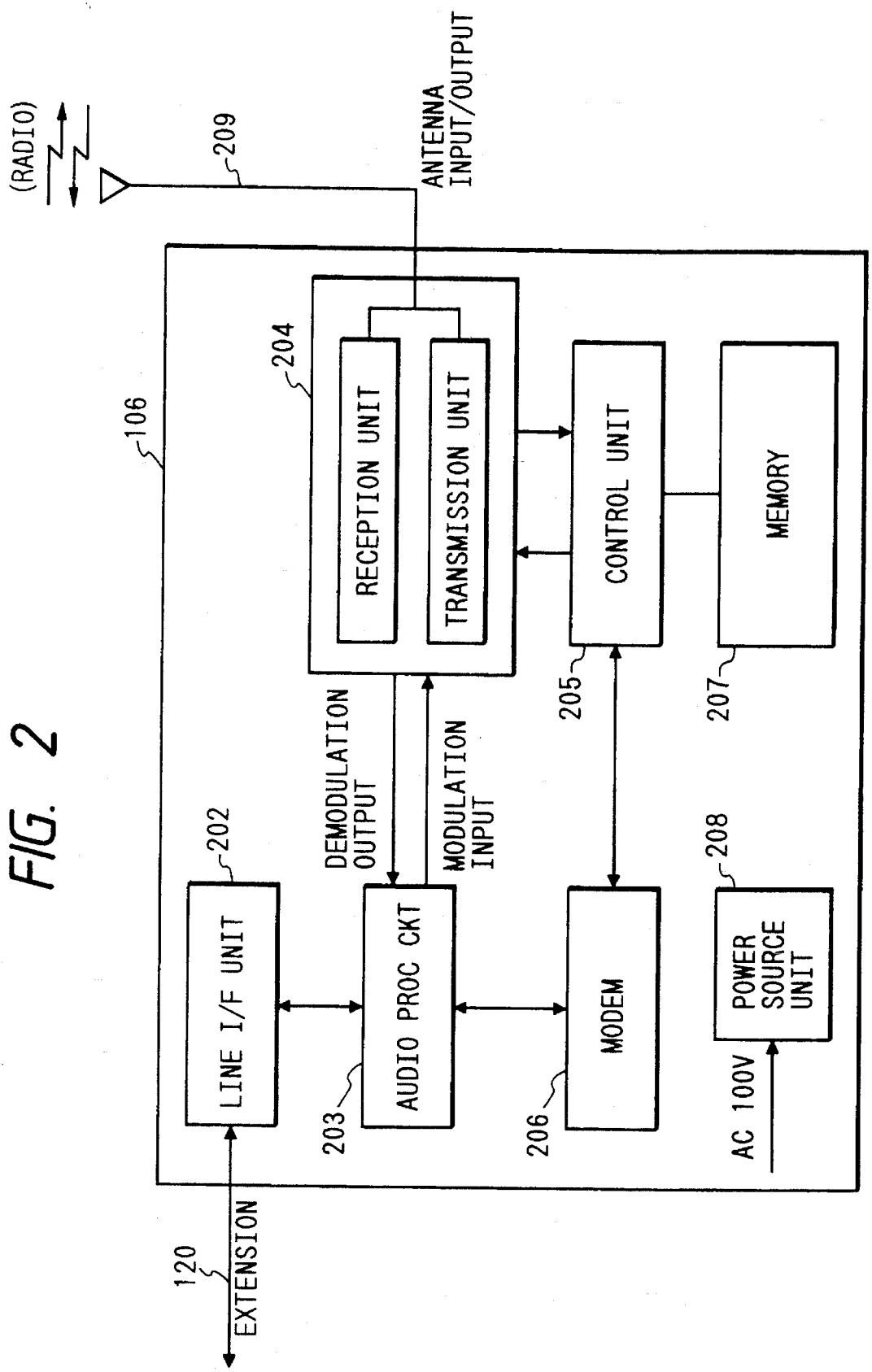
FIG. 2 is a block diagram of a fixed unit of the first embodiment.

FIG. 2 is a block diagram of the fixed units 106 and 107. Reference numeral 202 denotes a line interface unit which encloses therein extensions 120 for connection with the main apparatus 102. The line interface unit 202 is connected to a transmission/reception unit 204 through an audio processing circuit 203. The line interface unit 202, audio processing circuit 203, and transmission/reception unit 204 are controlled by a control unit 205. Control data between the control unit 205 of the fixed unit and the mobile unit is transmitted and received through a modem 206, the audio processing circuit 203, transmission/reception unit 204, and an antenna 209. ID (identification numbers) are stored in a memory 207 and are read to the control unit 205. A power source is derived from an AC (alternating current) 100 V (volts) source by a power source unit 208. Reference numeral 209 denotes the antenna to transmit and receive a radio signal.

The control data between the fixed unit and the main apparatus 102 is transmitted and received between the control unit 205 and the main apparatus 102 through the line interface unit 202 and the extension 120.

Figure 3:
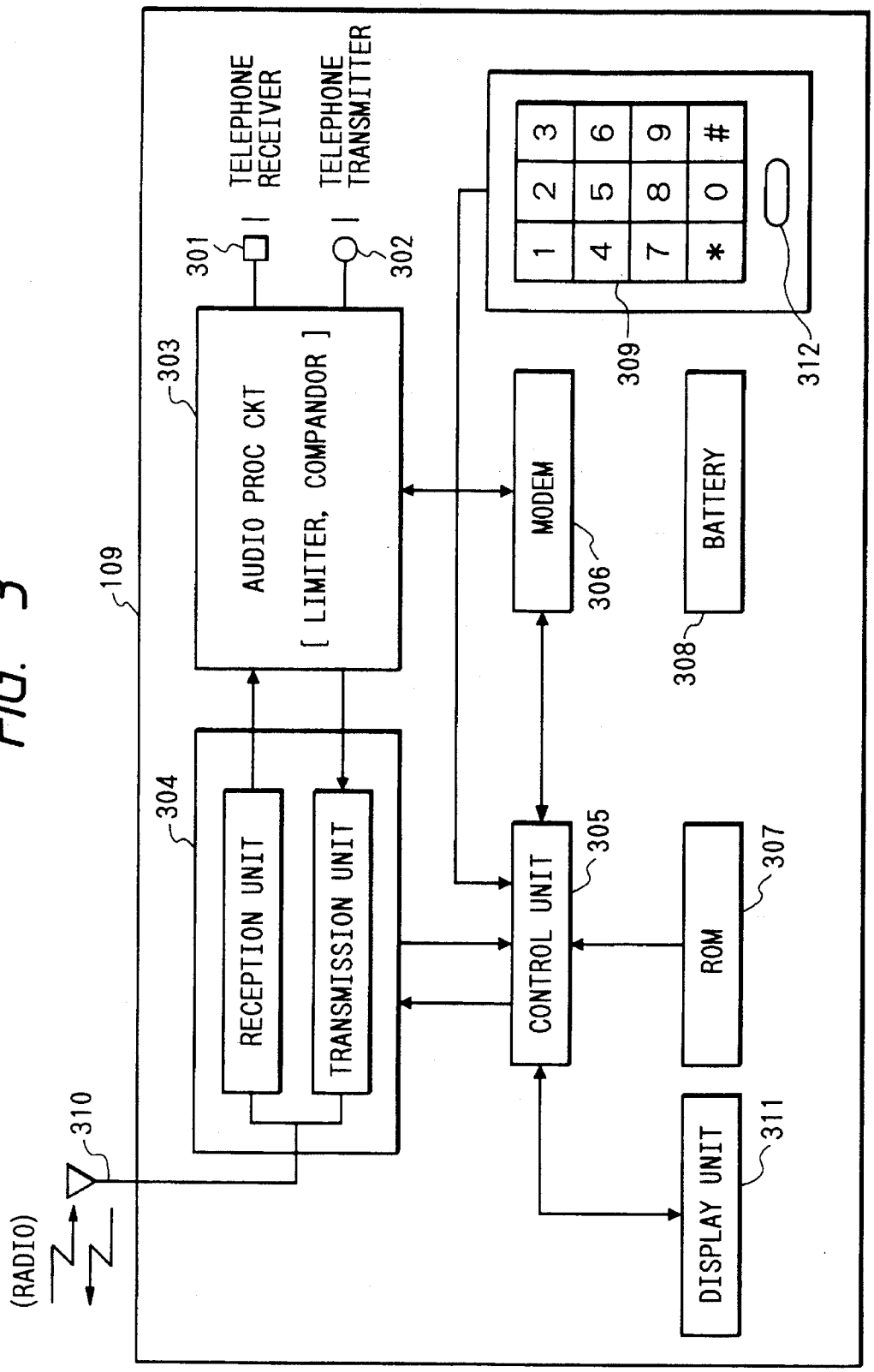
FIG. 3 is a block diagram of a mobile unit of the first embodiment.

FIG. 3 is a block diagram of the mobile units 109 to 114. A telephone transmitter 302 and a telephone receiver 301 are connected to a transmission/reception unit 304 through an audio processing circuit 303. The audio processing circuit 303 and transmission/reception unit 304 are controlled by a control unit 305. Information from a ten-key 309 and a speech button 312 are supplied to the control unit 305. Control data between the fixed unit and the mobile unit is transmitted and received between the control unit 305 and the fixed unit through a modem 306, the audio processing circuit 303, the transmission/reception unit 304, and an antenna 310. ID is stored in a ROM 307 and is read by the control unit 305. A power source is supplied from a battery 308. Reference numeral 310 denotes the antenna which is used to transmit and receive a radio signal and 311 indicates a display unit to display various states of the telephone including the telephone number.

Information regarding an external line state is supplied to the control unit 305 through the modem 306. The control unit 305 discriminates the received information and instructs the display unit 311 to display.

Speech communications between the fixed units 106 and 107 and the mobile units 109 to 114 are executed by designating a desired partner by the ID.

Figure 4:
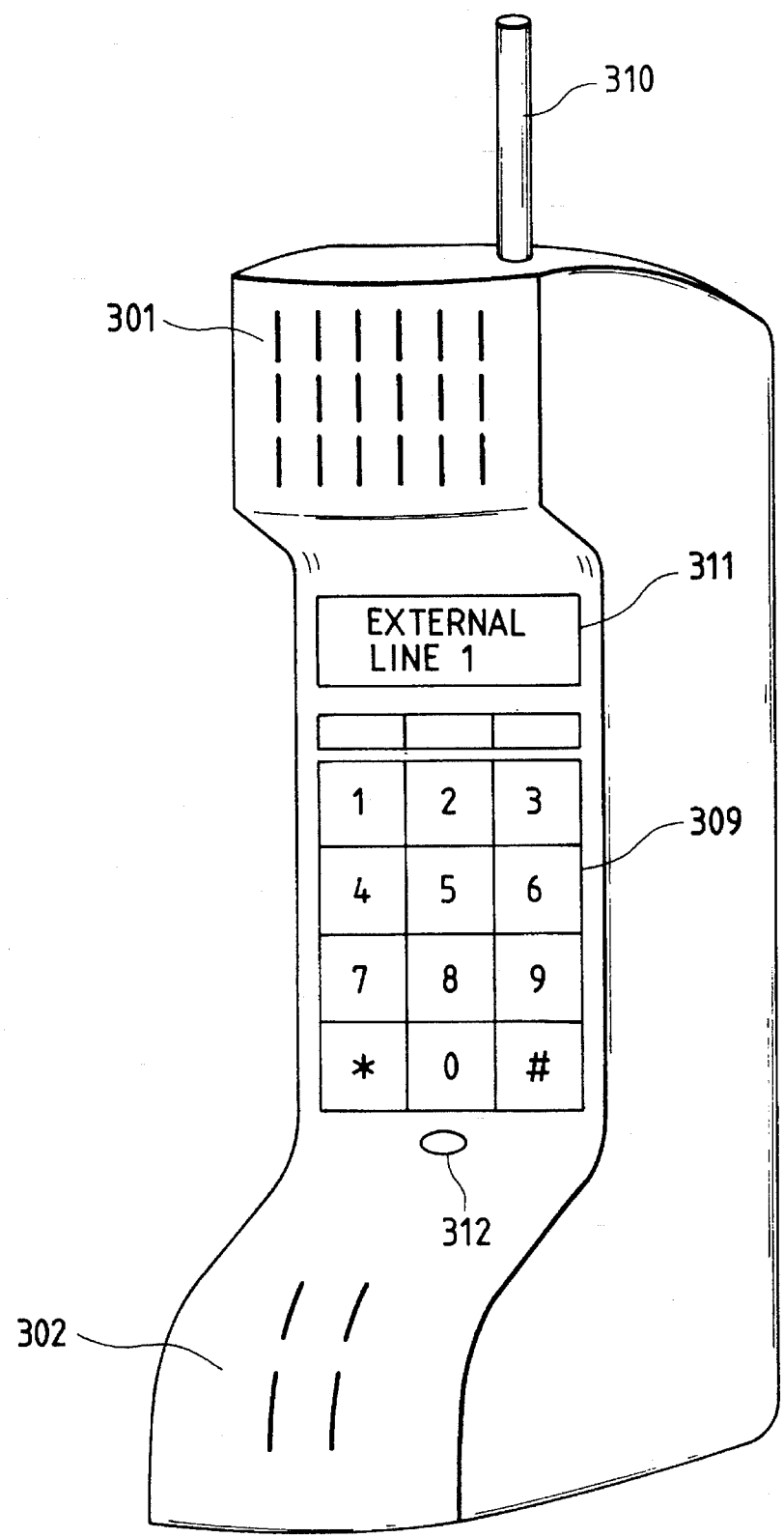
FIG. 4 is an external view of the mobile unit of the first embodiment.
Figure 5A:
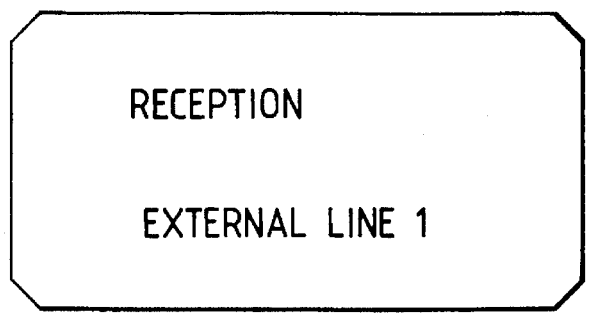
FIGS. 5A to 5C are diagrams of a display unit of the first embodiment.
Figure 5B:
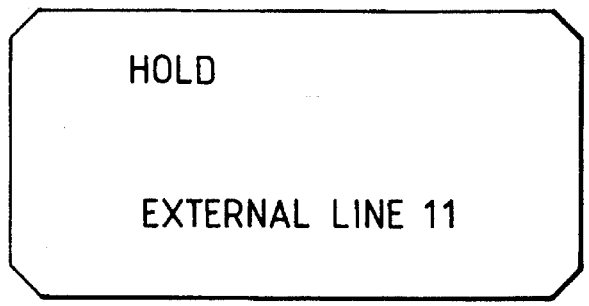
Figure 5C:
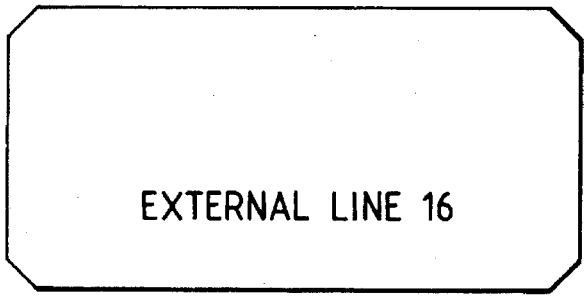

FIG. 4 is an external view of the mobile units 109 to 114. FIG. 5A is a diagram showing a display state of the display unit 311 when an external line receives a call. FIG. 5B is a diagram showing a display state of the display unit 311 when a call is held. FIG. 5C is a diagram showing a display state of the display unit 311 when an external line is captured.

Processes in the above three cases will now be explained hereinbelow.

Figure 6:
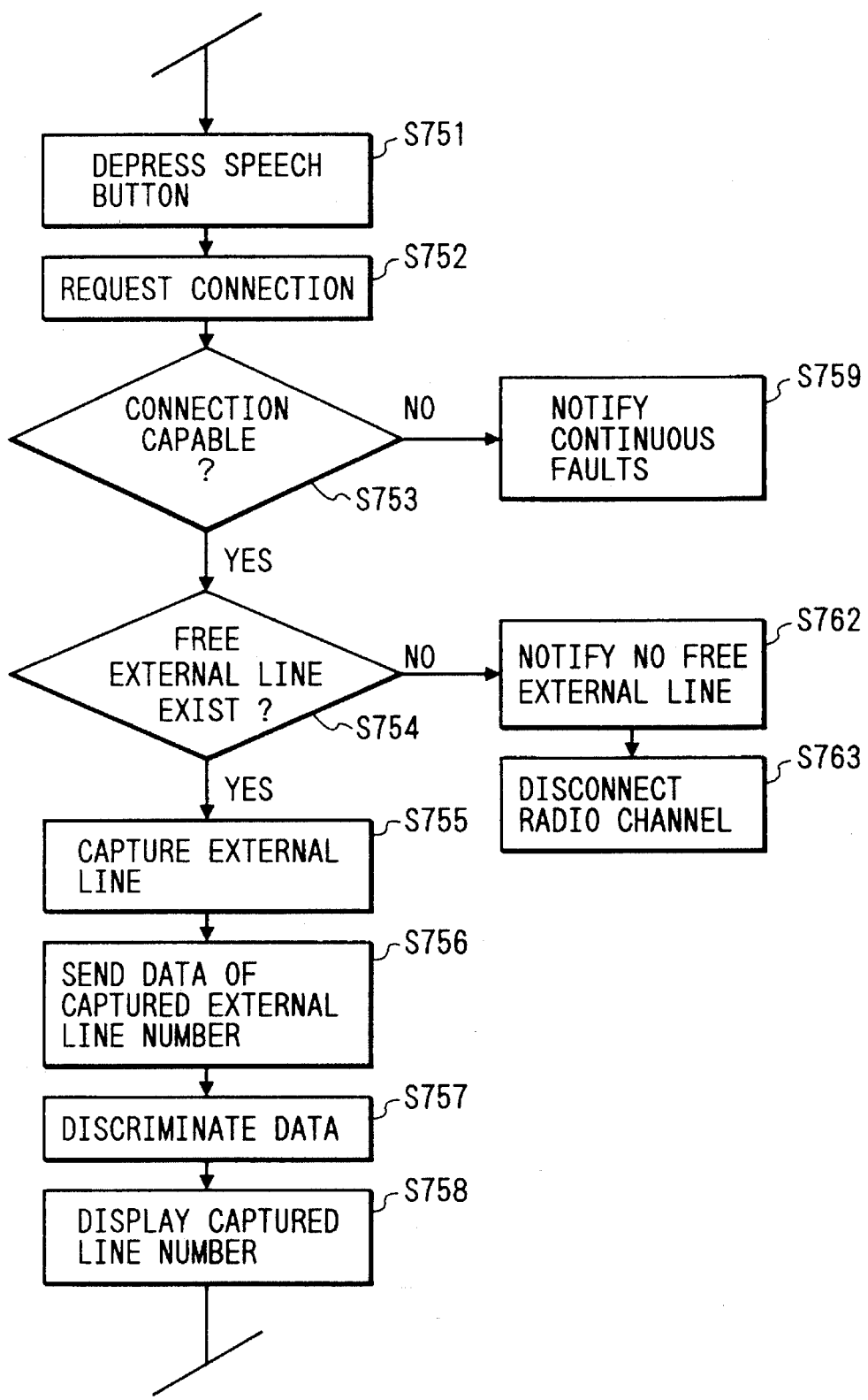
FIG. 6 is a flowchart for processes upon originating call in the first embodiment.

<Processes upon originating call (FIG. 6)>

When the speech button 312 is depressed (S751), the control unit 305 of the mobile unit sends a request to the corresponding fixed unit through the modem 306 so as to connect a radio channel (S752). In the case where the radio channel cannot be connected (S753) due to absence of a free radio channel or because the mobile unit is too far from the fixed unit or the like, the control unit 305 allows a message indicative of the connection fault to be displayed on the display unit 311 (S759).

When the radio channel can be connected, the control unit 205 of the fixed unit discriminates whether there is a free line among the external lines enclosed in the main apparatus 102 or not by referring to the memory 207 (S754), thereby capturing the free line (S755). The main control unit 108 of the main apparatus 102 recognizes use states of the external lines. The main control unit 108 sequentially notifies the use states to the fixed units 106 and 107. The fixed units 106 and 107 store the use states into each memory 207.

When there is no free line, the control unit 205 sends data indicative of the absence of the free line to the mobile unit which has performed the originating call through the radio channel. The control units 305 of the mobile unit receives such data and allows a message indicative of the absence of free line to be displayed on the display unit 311 (S762). In such a case, the radio channel is disconnected (S763).

When there is a free line, the control unit 205 sends the data of the line captured by the main apparatus 102 to the mobile unit which has performed the originating call through the radio channel (S756). The control unit 305 of the mobile unit discriminates the transmitted data (S757). The captured external line number is displayed on the display unit 311 as shown in FIG. 5C and is notified to the user (S758).

The main control unit 108 of the main apparatus 102 captures the external line designated from the fixed unit. When the operator inputs the telephone number by the ten-key, the fixed unit receives a ten-key signal and sends to the main apparatus 102. The control unit 108 of the main apparatus 102 performs an originating call in accordance with the ten-key signal received from the fixed unit and, after that, the captured external line is connected to the fixed unit. The fixed unit connects the mobile unit in which the speech button 312 has been depressed to the external line through the radio line.

Figure 7:
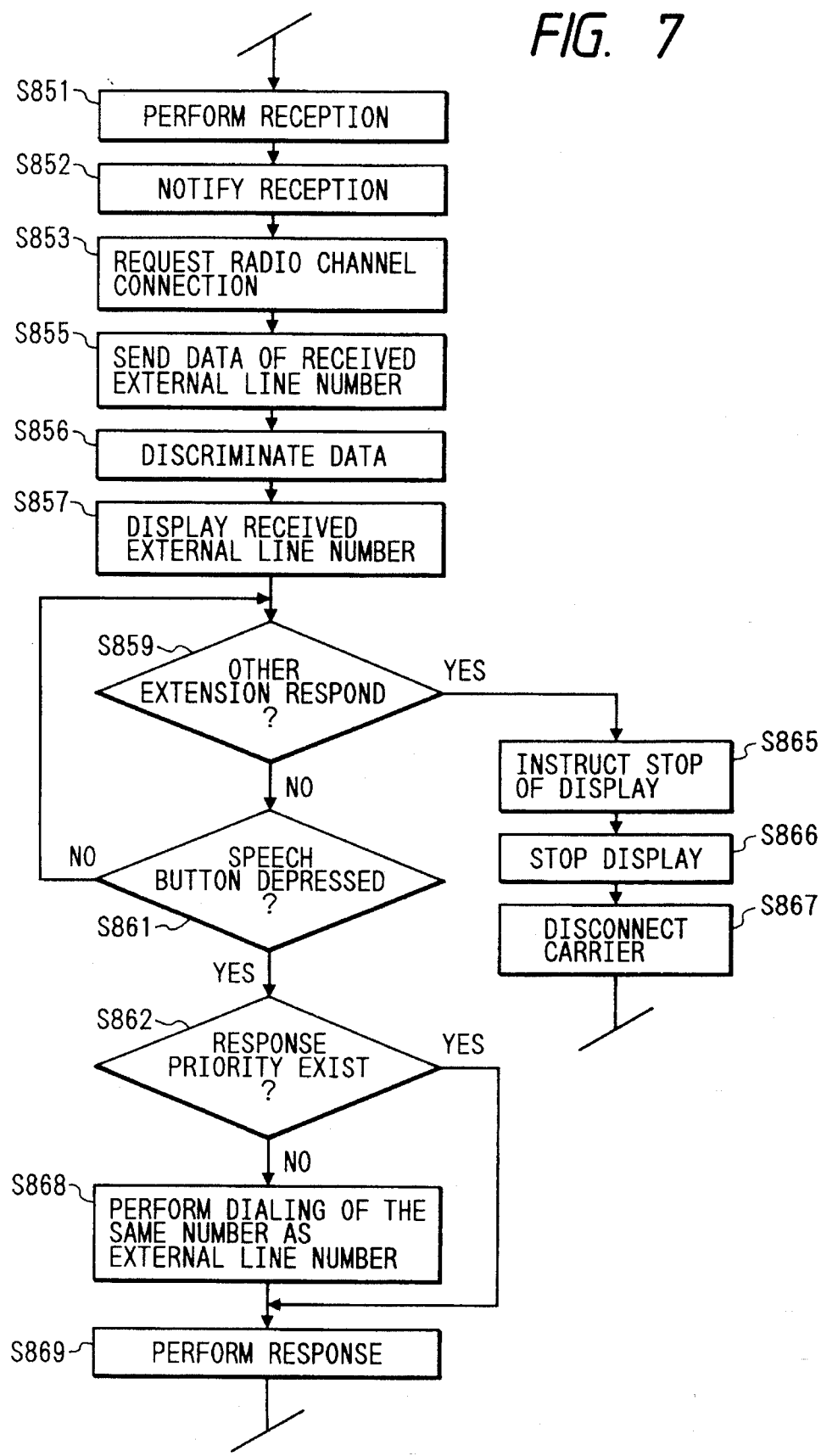
FIG. 7 is a flowchart for processes upon reception call in the first embodiment.

<Processes upon reception call (FIG. 7)>

When a call is received by the main apparatus 102 (S851), the main control unit 108 of the main apparatus 102 designates the reception external line number data to the fixed units 106 and 107 and notifies of the reception (S852). On the other hand, the control unit 205 of the fixed unit sends a request to each mobile unit so as to connect the radio channel (S853). When the radio channel can be connected, the control unit 205 of the fixed unit sends the external line number data which has been received to the main apparatus 102 to the mobile unit through the radio channel (S855). The control unit 305 of the mobile unit discriminates the received data (S856). The received external line number is displayed on the display unit 311 as shown in FIG. 5A (S857).

When the speech button 312 is depressed (S861) in order to respond to the reception call, a response key depression signal is notified to the main control unit 108 of the main apparatus 102 through the fixed unit. The main control unti 108 discriminates whether the reception to the external line is for the mobile unit which has responded or not, that is, whether the response mobile unit has a priority to the external line reception or not (S862). When the mobile unit has the priority, the main control unit 108 allows the response mobile unit to respond to the reception (S868). When the mobile unit doesn't have the priority, in the case where the dial key of the external line number is depressed (S868) after the speech button 312 was depressed, the main control unit 108 allows the response mobile unit to receive the call.

When the call is responded by another extension telephone (S859), the main control unit 108 of the main apparatus 102 sends the data to the mobile unit through the fixed units 106 and 107 so as to stop the reception display (S865). The mobile unit which has received the data stops the display (S866). After that, the radio channel is disconnected (S867).

When the reception specifies a special mobile unit and an extension telephone, the main control unit 108 allows only the mobile unit and the extension telephone to ring. In the case of responding by the other mobile units which don't ring, the response key and the ten-key corresponding to the external line number are depressed. The control unit 305 of the mobile unit transmits this information to the fixed unit through the modem 306, audio processing circuit 303, transmission/reception unit 304, and antenna 310. The fixed unit sends the received signal to the main control unit 108. When the response key information and external line number information are received from the mobile units which don't ring, the main control unit 108 allows those mobile units to respond to the reception.

When there are a plurality of reception external lines, the control unit 205 of the fixed unit sends a display command of the first reception external line number through the radio line and, thereafter, sends a display command of the second reception external line number. The mobile unit time-sharingly displays the numbers of the plurality of external lines which have received.

Figure 8:
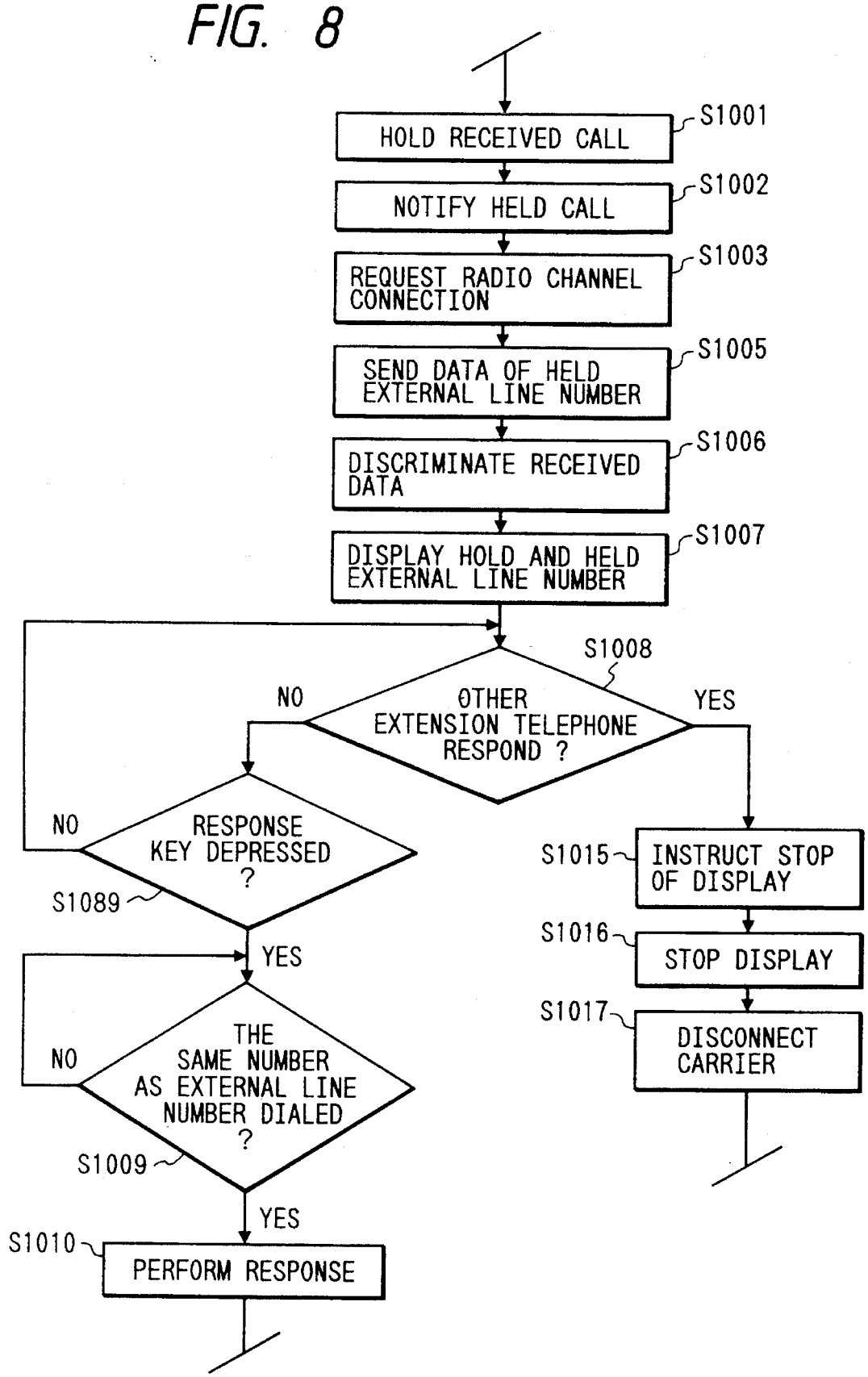
FIG. 8 is a flowchart for processes upon transfer in the first embodiment.

<Processes upon transfer (FIG. 8)>

It is now assumed that the extension telephone or mobile unit has responded to the call received to the main apparatus 102 and held the call (S1001). When the call is held, the main control unit 108 of the main apparatus 102 controls the speech channel 115 and connects the held external line to the sound source 116 and sends a holding sound to the held external line. The main control unit 108 of the main apparatus 102 notifies that the held call exists in the control units 205 of the fixed units 106 and 107 and in the extension telephones 103 to 105 and also notifies the held external line number (S1002). The control unit 205 of the fixed unit sends a request to the mobile units 109 to 114 through the modem 206 so as to connect the radio channel (S1003). When the radio channel is connected, the control unit 205 sends the data of the held external line number to the mobile units 109 to 114 through the radio channel (S1005). The control unit 305 of the mobile unit discriminates the received data (S1006). A message of "hold" and the held external line number are displayed on the display unit 311 as shown in FIG. 5B (S1007). After the speech button 312 was depressed (S1089) in order to respond to the held call, when the dial key of the held external line number is depressed (S1009), the control unit 305 of the mobile unit sends a response key depression signal and an external line number signal to the corresponding fixed unit through the modem 306, antenna 310, and the like. The control unit 205 of the fixed unit analyzes the response key depression signal and external line number signal received through the antenna 209, modem 206, and the like and sends the codes corresponding to the analyzed signals to the main apparatus 102 through the line interface unit 202. The main control unit 108 of the main apparatus 102 decodes the codes received from the fixed unit. When the held external line number coincides with the external line number received from the mobile unit which has responded through the fixed unit, the held external line is connected to the fixed unit and the fact of the coincidence is notified as a code signal to the fixed unit. The control unit 205 of the fixed unit connects the mobile unit and the external line on the basis of the received code signal (S1010).

In the case where the call is responded by another extension telephone or mobile unit, the main control unit 108 of the main apparatus 102 sends the data to the mobile unit through the fixed unit so as to stop the display (S1011). Upon reception of such data, the mobile unit stops the display (S1012). After that, the radio channel is disconnected (S1013).

In the case where there are a plurality of held external lines, the control unit 205 of the fixed unit sends a display command of the first held external line number through the radio line and, after that, sends a display command of the second held external line number. The mobile unit time-sharingly notifies a plurality of held external line numbers. In the case where an external line reception occurs when either one of the external lines is in holding, the control unit 205 of the fixed unit transmits a control signal so that the messages of FIGS. 5A and 5B are time-sharingly repetitively displayed.

The control for allowing either one of the external lines to be selected from the mobile unit will now be briefly described. The necessity to select either one of the external lines from the mobile unit occurs in the case of responding to either one of the held external lines, the case of responding to the extension line which received (particularly, the case of a deputy response), or the case of the external line originating call.

In the mobile unit, when the speech button 312 is depressed and, further, the external line number is depressed by the ten-key 309, the control unti 305 sends a depression key signal as a radio signal to the fixed unit through the modem 306, audio processing circuit 303, transmission/reception unit 304, and antenna 310. The order to depress the speech button 312 and ten-key 309 can be also reversed. When the ten-key 309 is depressed, the control unit 305 displays the depressed number on the display unit 311 for confirmation. In the case where there are ten or more external lines, it is sufficient to input two digits of the extension number by the ten-key 309.

When the fixed unit and the radio line cannot be connected, the control unit 305 displays "radio impossible" on the display unit 311.

The control unit 205 of the fixed unit receives the radio signal transmitted from the mobile unit through the antenna 209, transmission/reception unit 204, audio processing circuit 203, and modem 206 and decodes into the code signal. Further, the control unit 205 transmits a code signal to designate the external line onto the control channel through the line interface unit 202 and the line 120 and transmits to the main apparatus 102. The code which is sent from the fixed unit to the main apparatus 102 is common to the external line designation code which is sent from each of the extension telephones 103 to 105 to the main apparatus 102.

The main control unit 108 of the main apparatus 102 executes the exchange control in accordance with the code received from the fixed unit. The main control unit 108 stores the states of the external lines, that is, a free state, a state in communication, a state in reception (in calling), and a holding state. For example, the main control unit 108 receives the number to designate the external line in reception from the fixed unit, the main control unit 108 controls the speech channel 115 and connects the external line in reception to the fixed unit which has transmitted the designated number. Since the mobile unit to which the designated number has been supplied and the line 120 are connected, a speech communication can be performed between the mobile unit and the external line in reception.

According to the embodiment, in the case where the speech button 312 in the mobile unit which has been rung by the main apparatus 102 is depressed, even when there is no input of the external line number, the main control unit 108 similarly detects the external line number and connects the line. Consequently, there is no need to display the external line number to the mobile unit which has been rung. The external line number can be also inputted in the case of responding by the mobile unit in ringing.

On the other hand, it is also possible to provide an exclusive lamp to inform the external line number and to select a desired external line number by the ten-key 309. Even such a construction is used, by commonly using the ten-key 309 as a key to select the external line, there are advantages such that an area of the operating section is reduced and an erroneous operation can be prevented.

When the main control unit 108 recognizes that the number to designate the held external line has been received from the fixed unit, the external line in reception is connected to the fixed unit which has transmitted the designated number. A speech communication, accordingly, can be performed between the mobile unit to which the designated number has been supplied and the held external line.

In the embodiment, the number of the held external line has been displayed to the mobile unit as shown in FIG. 5B. A flickering interval of the display, however, can be also changed in accordance with a holding state, a-receiving state, and a capturing state.

When the operator in holding has already known the external line number in communication by the display before holding, there is no need to display the held external line number to the mobile unit. The operator who is in holding can directly notify a message, for instance, "There is a call to the telephone No. 13." to the response person without using the telephone. The response person sequentially depresses the keys "1" and "3" by the ten-key 309, so that the operator can perform a holding response. That is, there is no need to display the held external line number to the display unit 311.

When the external line designated by the external line number received from the fixed unit is free, the main control unit 108 controls the external line interface 117 and captures the designated external line. After that, an originating call is performed in accordance with the input dial number.

The control to display the external line number to the mobile unit as shown in FIGS. 5A to 5C will now be briefly described hereinbelow.

When the main control unit 108 detects the reception or holding or captures either one of the external lines, a display mode command to designate either one of the reception, holding, and capture and the external line number are sent to the fixed unit.

When the control unit 205 of the fixed unit receives the display mode command and the external line number through the control channel of the line 120 and the line interface unit 202, the control unit 205 transmits those signals as radio signals to the mobile unit through the modem 206, audio processing circuit 203, transmission/reception unit 204, and antenna 209.

When the control unit 305 of the mobile unit receives the radio signals through the antenna 310, transmission/reception unit 304, audio processing circuit 303, and modem 306, the control unit 305 analyzes the reception signals and controls the display unit 311 so as to display the messages as shown in FIGS. 5A to 5C.

The key to select and capture the external line upon reception or holding is not limited to the ten-key 309 but an exclusive key may be also provided. Even by such a construction, since the dispaly unit is also commonly used, the area of the operating section can be effectively used and the erroneous operation can be prevented.

The telephone function can be also provided for the fixed unit.

Figure 9:
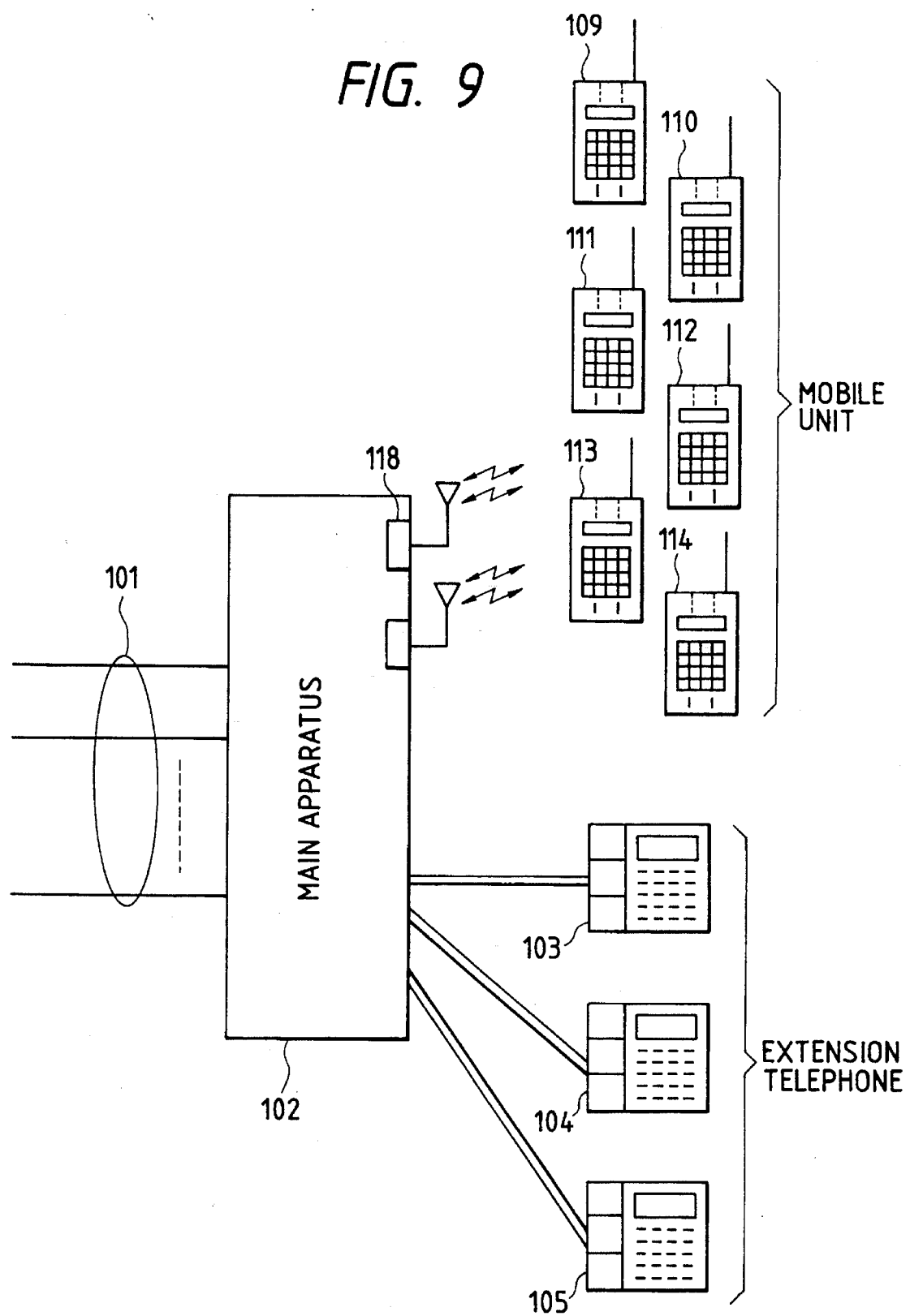
FIG. 9 is a system constructional diagram of another embodiment.

In the embodiment shown in FIG. 1, the main apparatus and the fixed unit are constructed in separate casings. As shown in FIG. 9, however, the portion which functions as a main apparatus and the portion which functions as a fixed unit can be also enclosed in the same casing.

A one-touch dial key can be also used instead of the ten-key.

Figure 10:
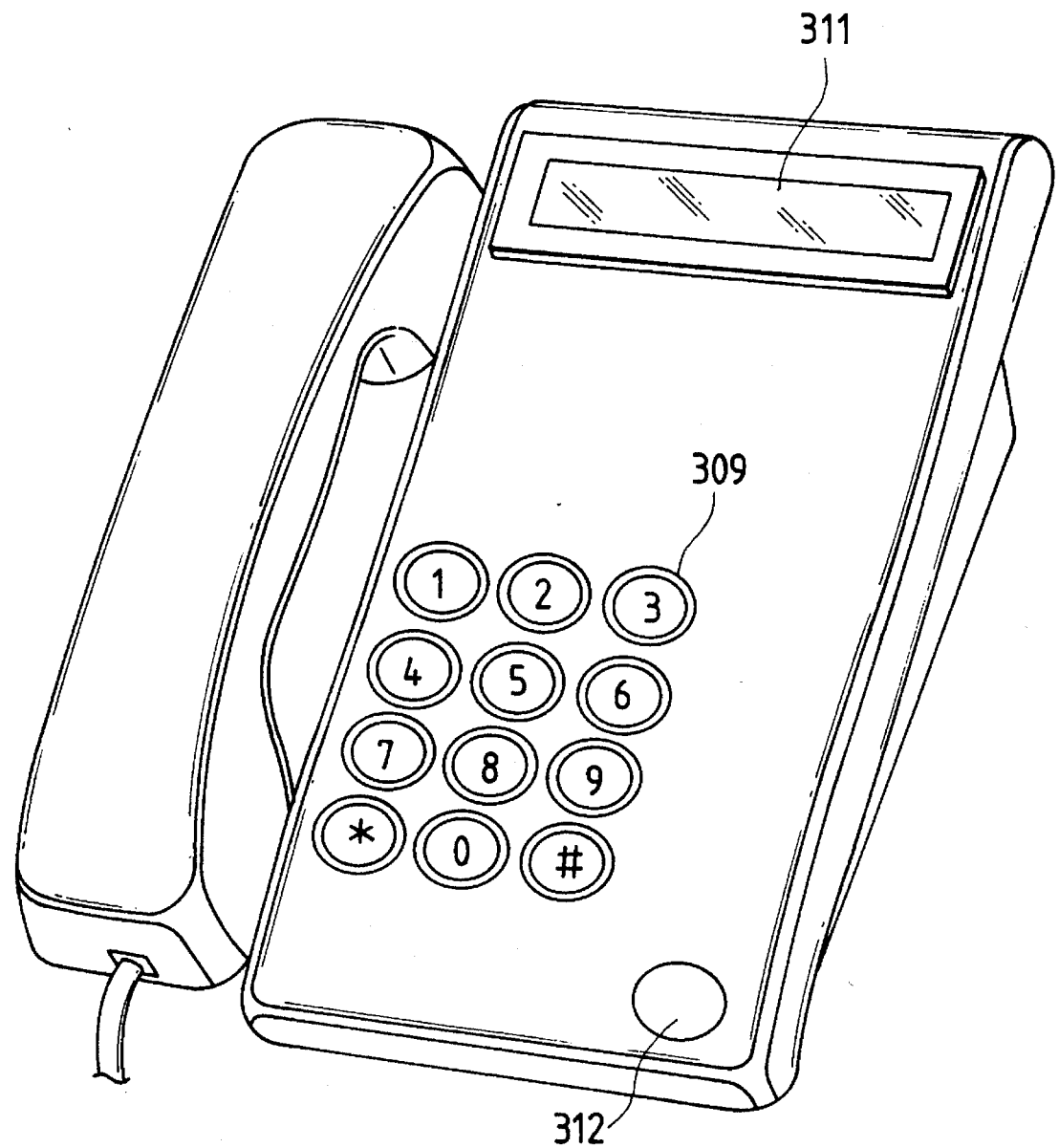
FIG. 10 is an external view of an extension telephone of another embodiment.

The invention can be also applied to the extension telephones 103 to 105 as shown in FIG. 10. In such a case, the main control unit 108 of the main apparauts 102 executes the line control in accordance with the depression of the ten-key 309 of the extension telephone. The extension telephone performs the display on the basis of the control of the main apparatus 102.

Figure 11:
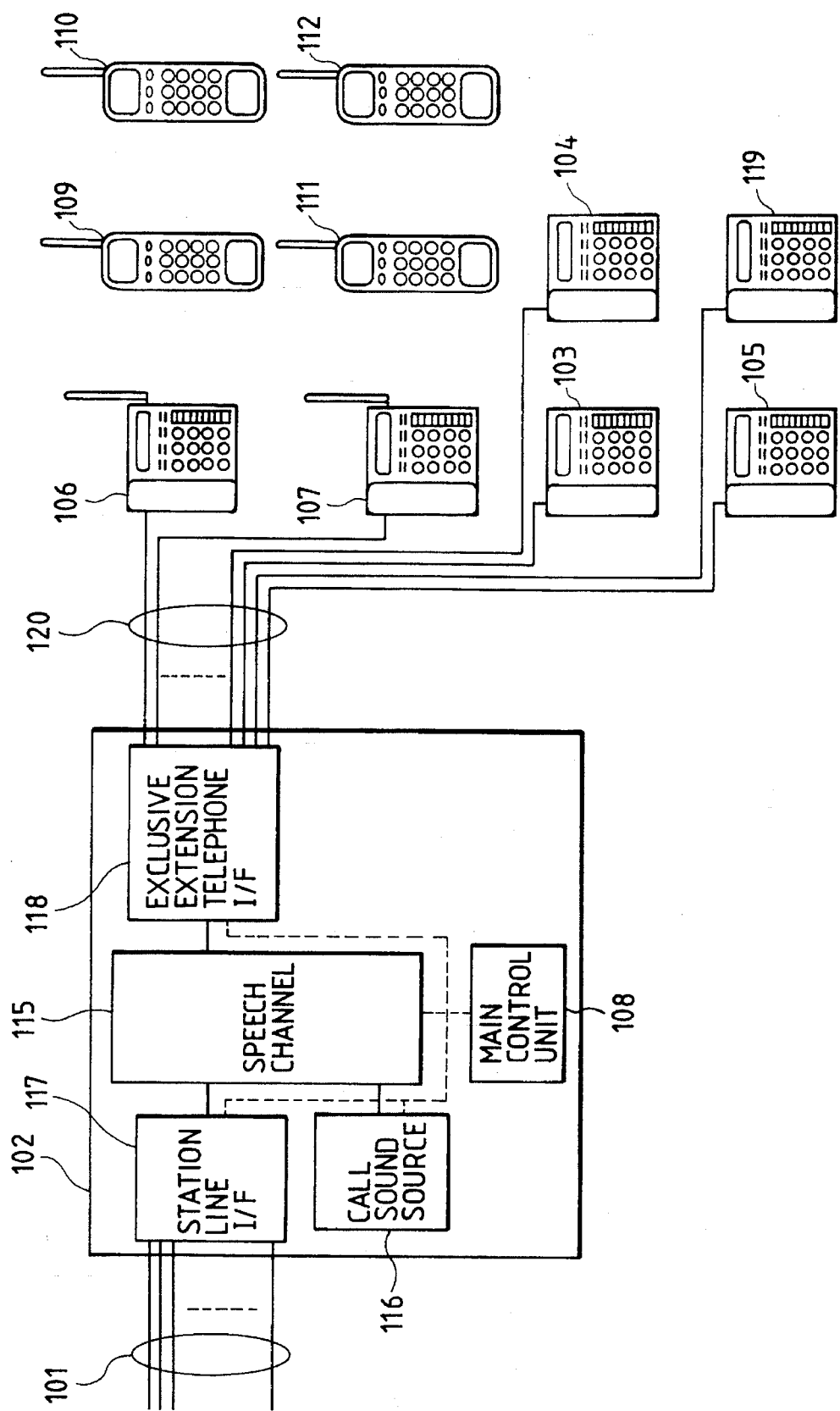
FIG. 11 is a constructional diagram of a system of the second embodiment.

FIG. 11 is a constructional diagram of a system of the second embodiment of the invention. Reference numeral 102 denotes the main apparatus which encloses a plurality of external lines and a plurality of extensions and has the exchange function; 101 the lines such as PBX (private branch exchange) extensions, ordinary subscribers' lines, and the like; 120 the extensions to which exclusive cordless extension telephones or exclusive extension telephones are connected; 117 the external line interface which encloses the lines such as PBX extensions, ordinary subscribers' lines, and the like; 118 an exclusive extension telephone interface which encloses exclusive extension telephones; 115 the speech channel; 116 the call sound source; 108 the main control unit for controlling the speech channel 115 and discriminating the data regarding the reception external line number, held external line number, captured external line number, and connected external line number; 103 to 105 and 119 telephones (exclusive extension telephones) connected to the main apparatus; 106 and 107 the fixed units (exclusive cordless extension telephones) 1 connected to the main apparatus 102; and 109 to 112 mobile units which are connected to the fixed units in a wireless manner.

A construction of each of the fixed units 106 and 107 is common to that in FIG. 2.

Figure 12:
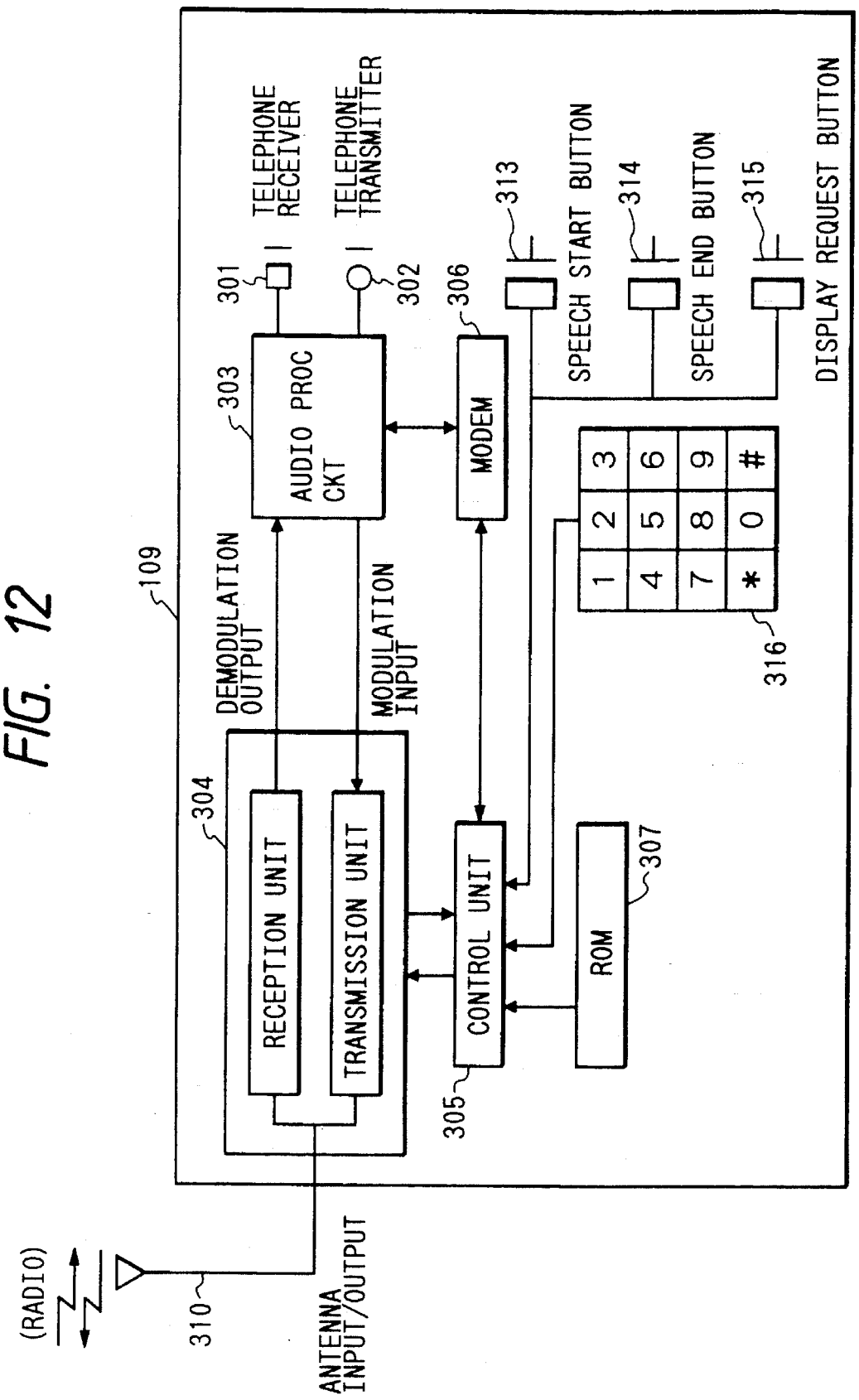
FIG. 12 is a block diagram of mobile unit of the second embodiment.

FIG. 12 is a blcok diagram of the mobile units 109 to 112. The telephone transmitter 302 and telephone receiver 301 are connected to the transmission/reception unit 304 through the audio processing circuit 303. The audio processing circuit 303 and transmission/reception unit 304 are controlled by the control unit 305. Information from a key pad (ten-key) 316, a speech start button 313, a speech end button 314, and a display request button 315 are supplied to the control unit 305. Information regarding external line states are supplied from the fixed units to the control unit 305 through the modem 306. The control unit 305 discriminates this information and instructs so as to display by light emitting elements assembled in the key pad 316. The control data is transmitted and received between the audio processing circuit 303 and the control unit 305 through the modem 306. ID is stored in the ROM 307 and is read to the control unit 305. Reference numeral 310 denotes the antenna which is used to transmit and receive radio signals.

Figure 13:
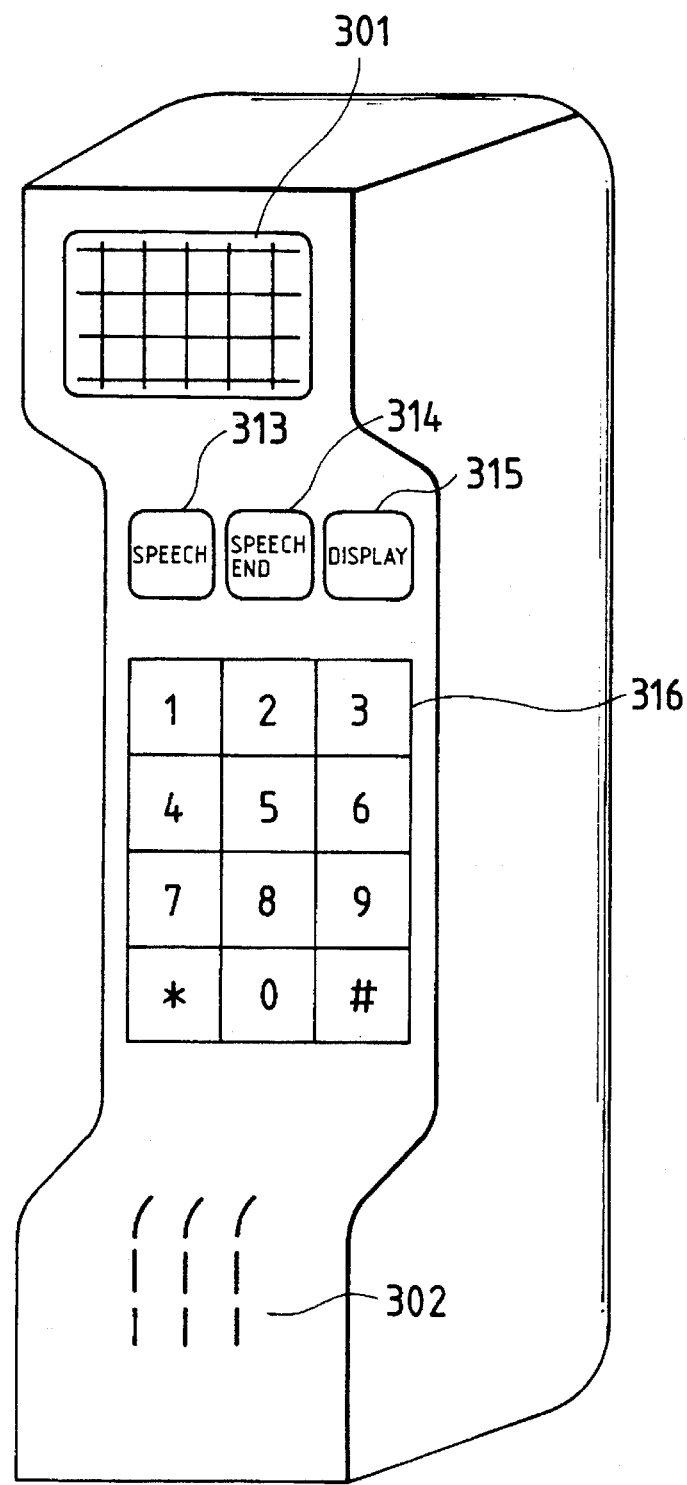
FIG. 13 is an external view of a mobile unit of the second embodiment.
Figure 14:
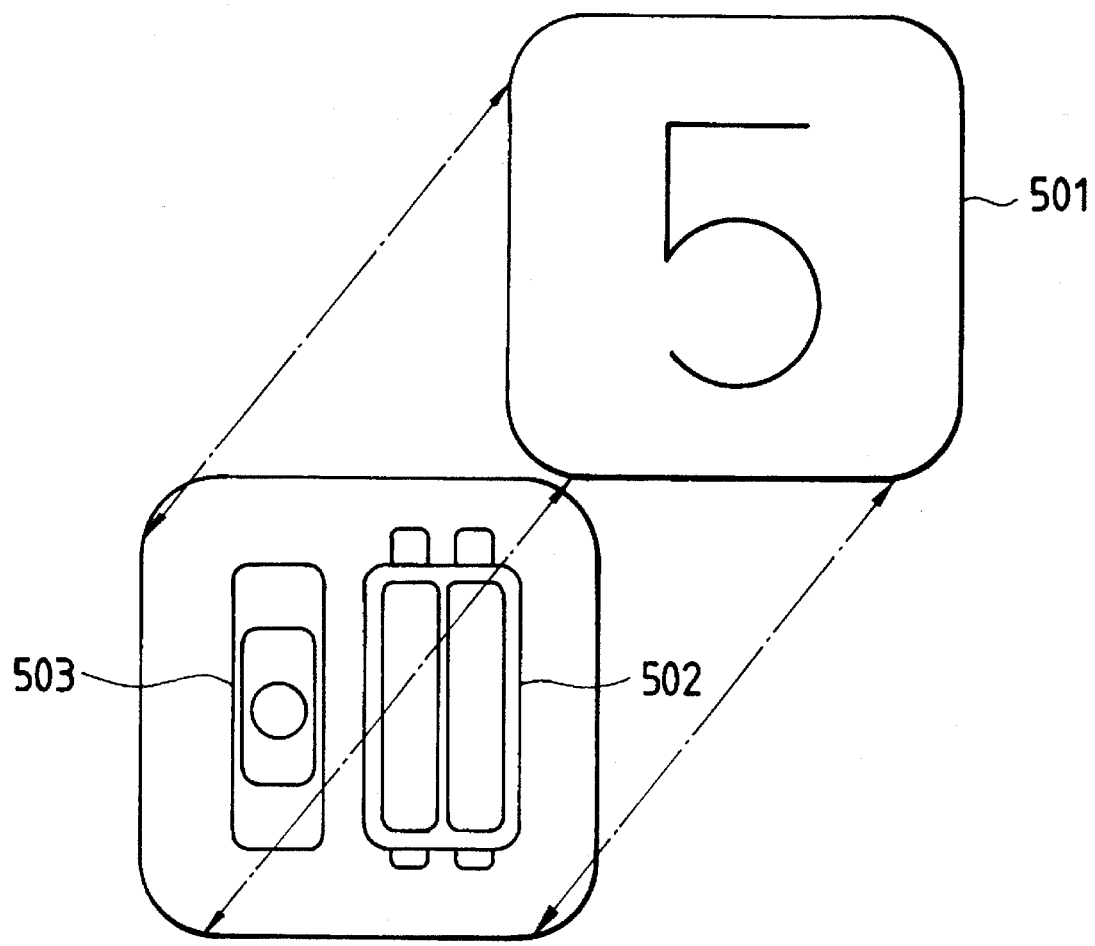
FIG. 14 is a structural diagram of a dial key of the second embodiment.

FIG. 13 is an external view showing an example of the mobile units 109 to 112. FIG. 14 is a constructional diagram of the dial key (ten-key) 316. LEDs (light emitting diodes) 502 of two colors and a switch 503 are installed under a translucent dial key (ten-key) 501.

The respective processes will now be described hereinbelow.

Figure 15:
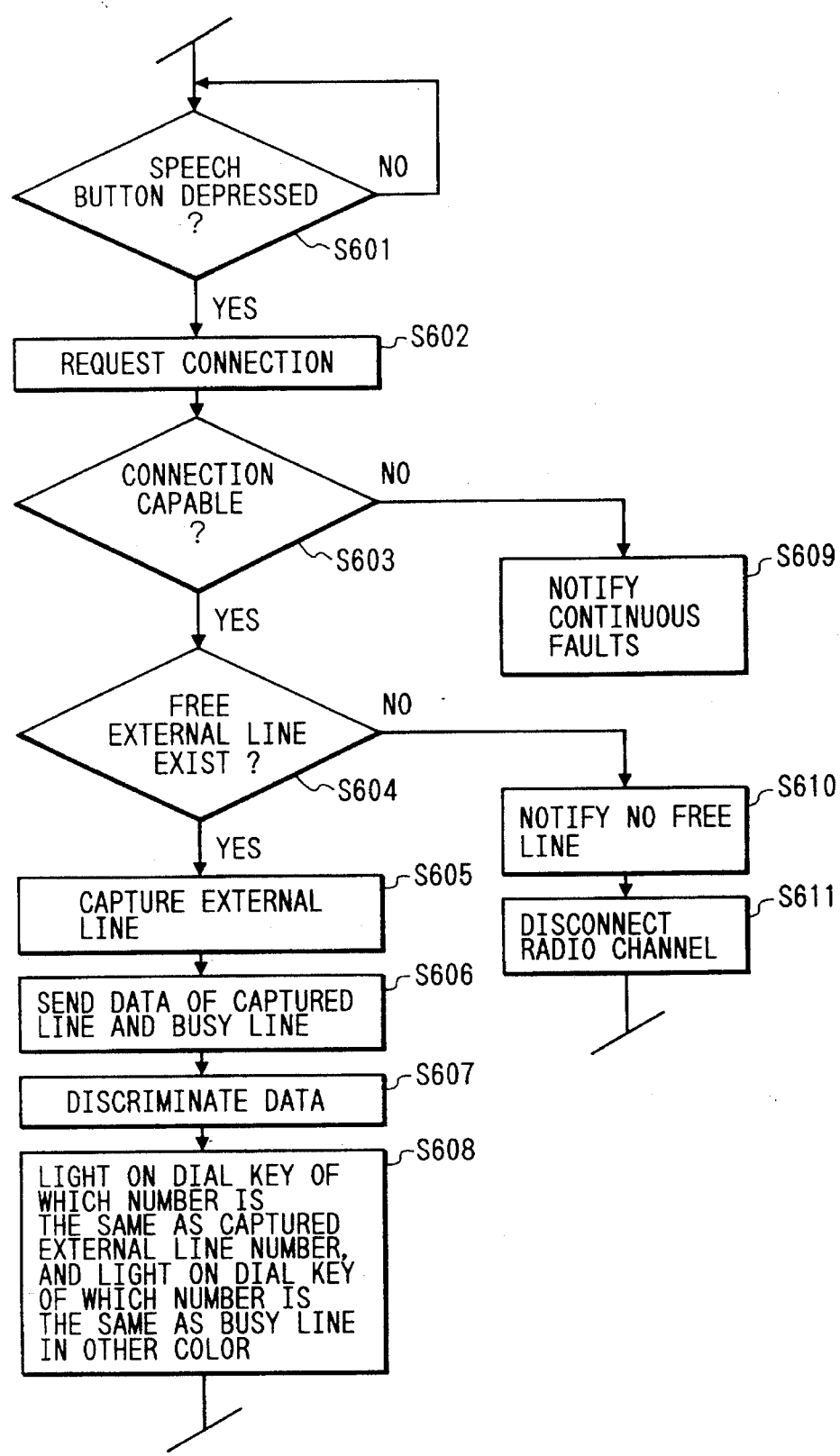
FIG. 15 is a flowchart for processes upon originating call by the depression of a speech key in the second embodiment.

<Flow 1 for processes upon originating call (FIG. 15)>

When the speech start button 313 is depressed (S601), the control unit 305 of the mobile unit requests the corresponding fixed unit so as to connect the radio channel (S602). When the radio channel cannot be connected due to absence of a free channel or the like (S603), the control unit 305 allows a predetermined tone to be generated from the telephone receiver 302, thereby notifying a connection failure (S609). When the radio channel can be connected, the control unit 205 of the fixed unit discriminates whether there is a free line among the external lines enclosed in the main apparatus 102 or not by referring to the internal memory (S604). The control unit 205 captures the free line (S605). The control unit 205 recognizes the use states of the external lines by receiving the notification from the main apparatus 102. When there is no free line, the control unit 205 sends data indicative of the absence of the free line through the radio channel and informs such a fact to the mobile unit which has requested the connection (S610) and, thereafter, disconnects the channel (S611).

When there is a free line, the control unit 205 of the fixed unit sends the data of the line captured by the main apparatus 102 and the data of the connected line to the mobile unit which has requested the connection through the radio line (S606). The control unit 305 of the mobile unit discriminates the above data (S607) and lights on the diode of the dial key of the same number as the captured external line number and also lights on the diode of the dial key of the same number as the number of the external line connected to the other extension by another color, thereby notifying to the user (S608).

That is, the control unit 305 of the mobile unit lights on the diode of the first color in the two-color LEDs 502 (FIG. 14) of the dial key of the same number as the captured external line number and lights on the diode of the second color of the dial key of the same number as the connected external line number.

Figure 16:
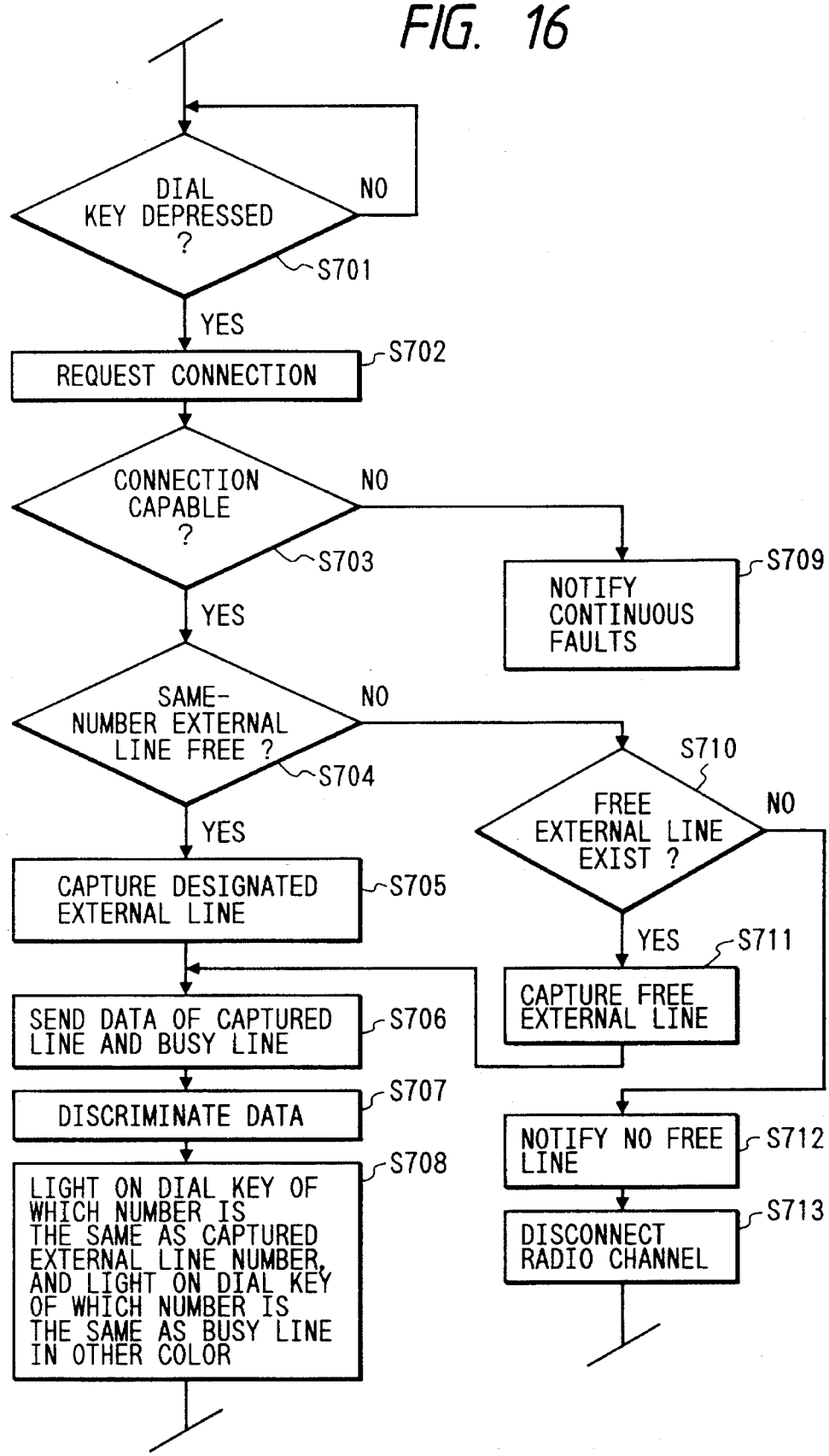
FIG. 16 is a flowchart for processes upon originating call by the depression of a dial key in the second embodiment.

<Flow 2 for processes upon originating call (FIG. 16)>

When the dial key of the same number as the number of external line to be captured is depressed (S701), the control unit 305 of the mobile unit requests the corresponding fixed unit so as to connect the radio channel (S702). When the radio channel cannot be connected (S703) due to a reason such that there is no free channel or the like, the control unit 305 notifies the connection failure (S709). When the radio channel can be connected, the control unit 205 of the fixed unit discriminates whether the designated external line is free or not (S704). When the designated external line is free, it is captured (S705). When the designated external line is busy, the control unit 205 discriminates whether there is a free line in the external lines enclosed in the main apparatus 102 or not (S710). The control unit 205 captures the free line (S711). When there is no free line, data indicative of the absence of the free line is transmitted through the radio channel and is displayed by the mobile unit which has requested the connection (S712). After that, the channel is disconnected (S713).

When the line is captured, the control unit 205 of the fixed unit sends the data of the line captured by the main apparatus 102 and the data of the line connected to the other extension to the mobile unit which has requested the connection through the radio line (S706). The control unit 305 of the mobile unit discriminates the data (S707) and lights on the diode of the dial key of the same number as the captured external line number and also lights on the diode of another color of the dial key of the same number as the number of the connected external line, thereby notifying to the user (S708).

Figure 17B:
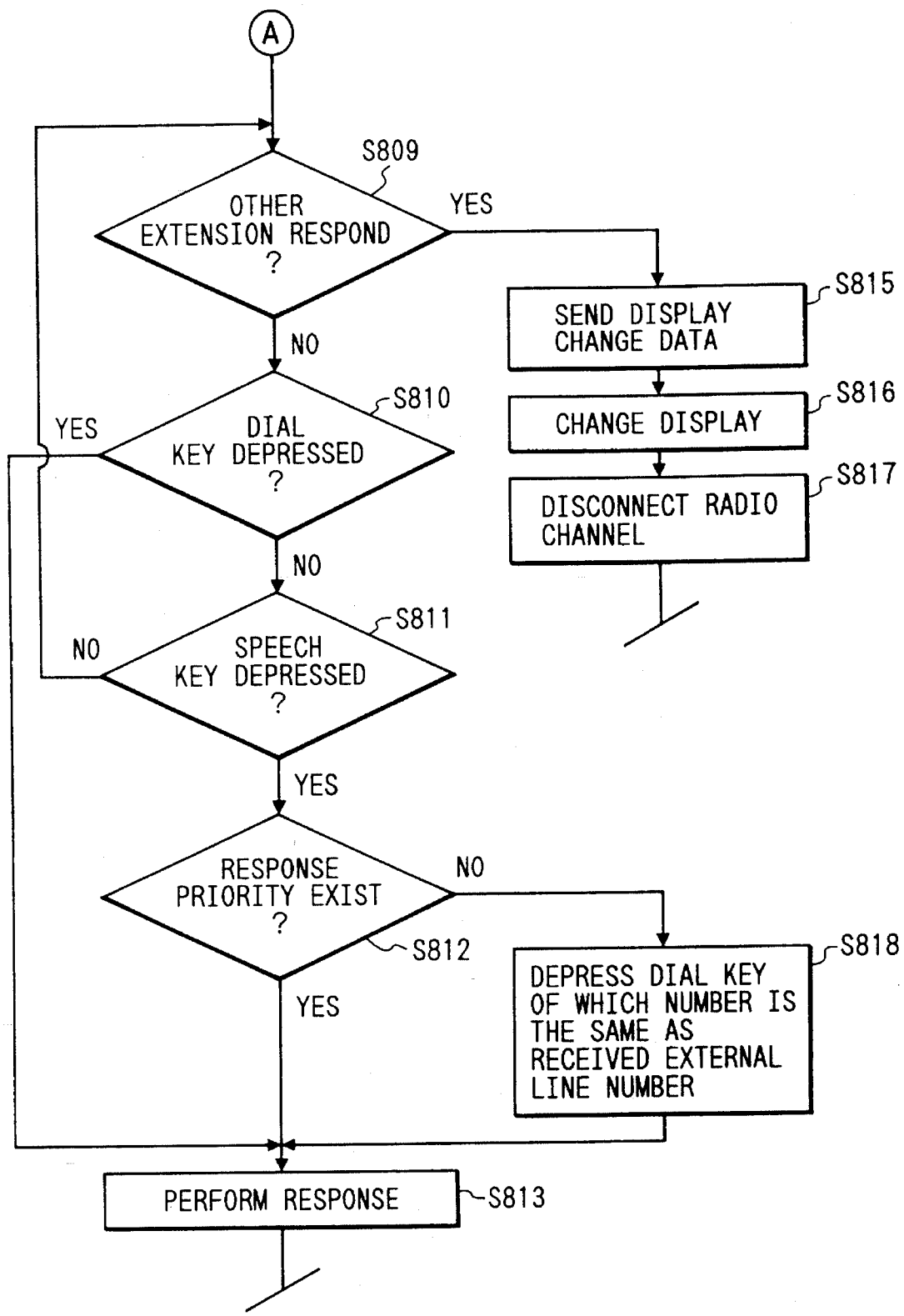
FIG. 17 is a flowchart for processes upon reception call in the second embodiment.

<Flow for processes upon reception call (FIG. 17)>

When a call is received to the main apparatus 102 (S801), the main apparatus 102 notifies the reception to the fixed units 106 and 107 and the extension telephones 103 to 105 and 119 (S802). The fixed units 106 and 107 request the mobile units 109 to 112 so as to connect the radio channel (S803). When the radio channel cannot be connected due to a reason such that there is no free channel or the like, the fixed unit rings (S814). When the radio channel can be connected, the data of the number of the external line which has been received to the main apparatus 102 and the data of the line connected to the other extension are sent to the mobile units 109 to 112 through the connected radio channel (S805). The control unit 305 of the mobile unit discriminates the received data (S806) and lights on the diode of the first color of the dial key of the same number as the received external line number and also lights on the diode of the other second color of the dial key of the same number as the connected external line number, thereby notifying to the user (S807). The control unit 305 rings the mobile unit (S808).

When the ten-key corresponding to the external line number is depressed (S810), the control unit 305 sends a response signal to the corresponding master unit through the radio channel. The control unit 205 of the master unit captures the reception external unit and responds (S813). Or, when the speech start button 313 is depressed (S81i), the control unit 305 discriminates whether the mobile unit has a priority to the external line reception or not (S812). When the relevant external line has the priority to the response of the mobile unit, it performs the response (S813). On the other hand, when the external line doesn't have the priority, a response is performed so long as the dial key of the external line number is depressed (S818) after the speech start button 313 was depressed.

When the call is responded to the other extension telephone (S809), the main apparatus 102 sends data to the mobile unit through the fixed unit so as to display a message indicating that the external line is busy (S815). Upon reception of the data, the control unit 305 of the mobile unit lights on the diode of the second color of the dial key of the same number as the external line number of the relevant external line (S816) and, thereafter, disconnects the radio channel (S817).

Figure 18:
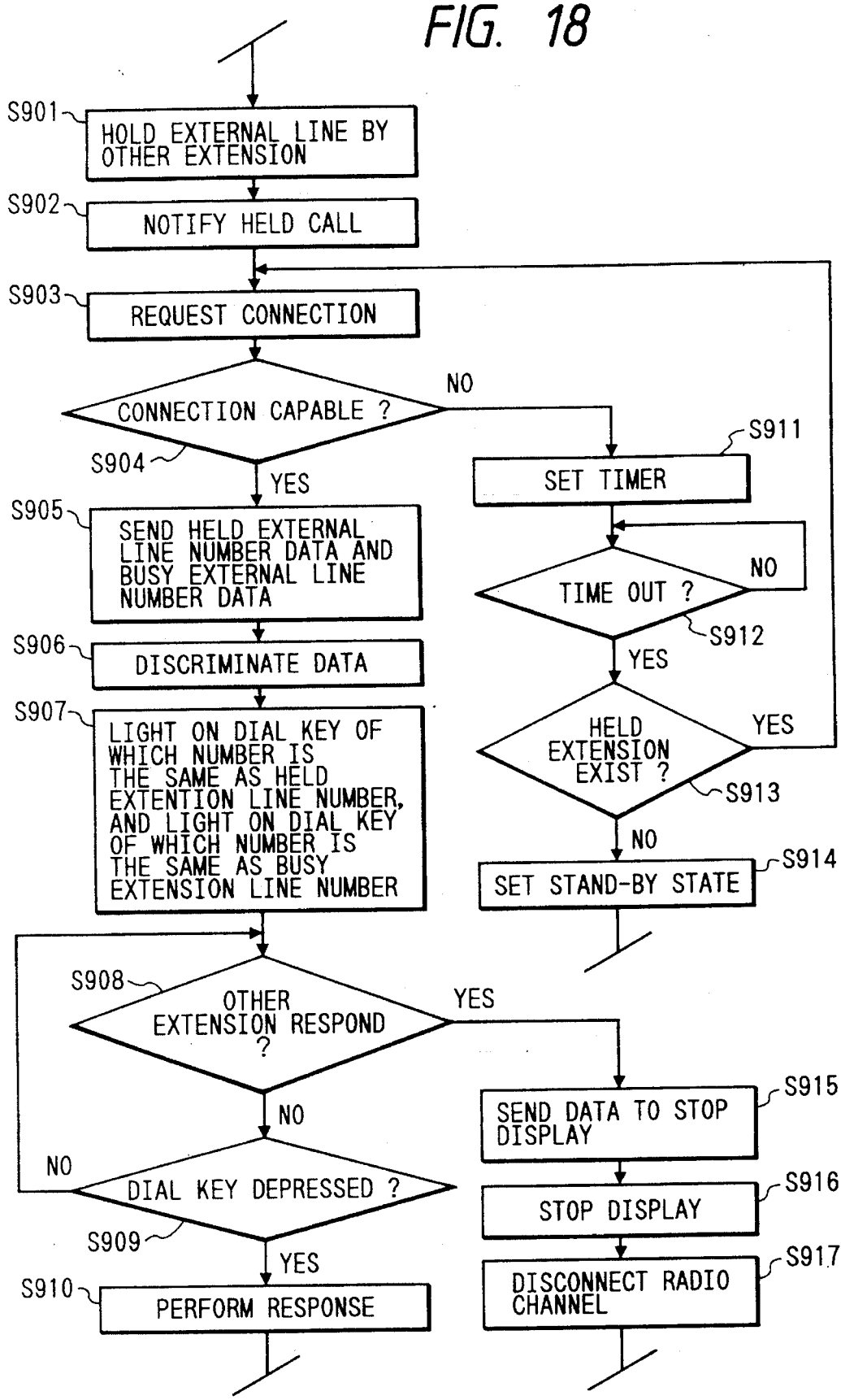
FIG. 18 is a flowchart for processes upon transfer in the second embodiment.

<Flow for processes upon transfer (FIG. 18)>

It is now assumed that the call received to the main apparatus 102 is responded to by the other extension telephone and held (S901). When the call is held, the main apparatus 102 notifies the presence of the held call to the fixed units 106 and 107 (S902). The control units 205 of the fixed units 106 and 107 request the mobile units 109 to 112 so as to connect the radio channel (S903). When the radio channel cannot be connected (S904) due to a reason such that there is no free channel or the like, the control Unit 205 sets the timer (S911). When the held call still remains (S913) at a time point of the time-out (S912), the control unit 205 again requests so as to connect the radio channel. When there is no held call, the apparatus is set into a stand-by state (S914).

When the radio channel is connected in step S904, the control unit 205 sends the data of the held external line number and the data of the connected line to the mobile unit through the channel (S905).

The control unit 305 of the mobile unit discriminates the received data (S906) and lights on the diode of the second color of the dial key of the same number as the held external line number, thereby notifying the held external line number. The control unit 305 further lights on the diode of the second color of the dial key of the same number as the connected external line number, thereby notifying the connected external line number (S907).

When the operator depresses the ten-key corresponding to the held external line number in order to respond to the held call (S909), the control unit 305 sends a response signal through the antenna 310 (S910). When the call is responded to the other extension telephone (S908), the main apparatus 102 sends data to the mobile units 109 to 112 through the fixed units 106 and 107 so as to display a message indicating that the relevant external line is busy (S915). The control unit 305 of the mobile unit 111 which has received the data lights on the diode of the dial key of the same number as the external line number of the relevant external line so as to display a message indicating that the relevant external line is busy (S916). After that, the radio channel is disconnected (S917).

Figure 19:
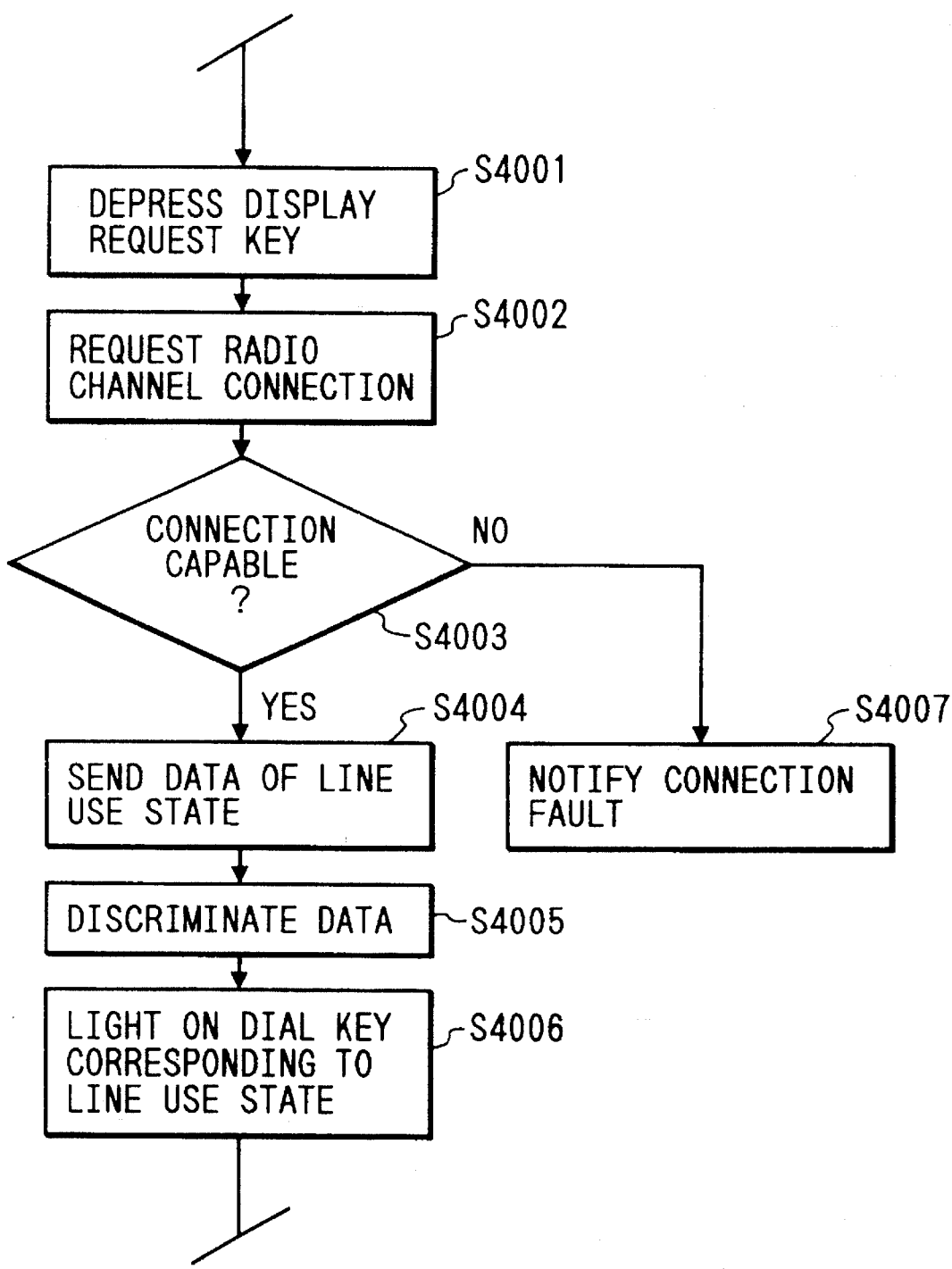
FIG. 19 is a flowchart for processes upon display of a speech state in the second embodiment.

<Flow for processes to request to display a speech state (FIG. 19)>

When the display request button 315 is depressed (S4001), the control unit 305 of the mobile unit requests the corresponding fixed unit so as to connect the radio channel (S4002). When the radio channel cannot be connected (S4003) due to absence of a free channel or the like, a connection failure is notified (S4007).

When the radio channel can be connected, the control unit 205 of the fixed unit sends the data of the connected line to the mobile unit through the radio line (S4004). The control unit 305 of the mobile unit discriminates the data (S4005) and lights on the diode of the dial key of the same number as the connected external line number, thereby notifying to the user (S4006).

For the main apparatus 102 and the fixed units 106 and 107, the portion having the function of the main apparatus 102 and the portion having the function of the fixed units 106 and 107 can be also enclosed in the same casing.

According to the embodiment as described above, the main control unit 108 of the main apparatus 102 notifies the use state of each of the enclosed external lines, that is, a state in reception, a state in holding, a state in use by the other extension, or a captured state for an originating call to each of the mobile units 109 to 112 through the fixed units 106 and 107.

The control unit 305 of each of the mobile units 109 to 112 analyzes the received information and lights up or flickers the ten-key in accordance with the use states of the external lines. When the use states of the external lines are displayed, in addition to the displays by the LEDs of two colors buried in each ten-key as shown in FIG. 14, LEDs 317 of two colors can be also provided near each key of the ten-key 316 as shown in FIG. 20. Liquid crystal display elements can be also used in place of the LEDs.

LEDs of two colors corresponding to a one-touch key can be also provided in place of the ten-key.

The invention can be also applied to telephones with cords.

Although the present invention has been described with respect to the preferred embodiments, the invention is not limited to the foregoing embodiments but many modifications and variations are possible within the spirit and scope of the appended claims of the invention.

What is claimed is:

1. A radio communication apparatus comprising:
   radio communicating means for communicating a radio signal;
   a plurality of dial keys; and
   a plurality of display means, each of which is provided in each of said plurality of dial keys, each of said plurality of display means displays a plurality of states of each of a plurality of external lines on the basis of the radio signal received by said radio communication means, respectively,
      wherein said plurality of display means change display outputs in accordance with a real-time change of the states of the plurality of external lines.

2. An apparatus according to claim 1, wherein said display means displays a called state and a busy state respectively with the different colors.

3. An apparatus according to claim 1, wherein said display means displays a hold state and a busy state respectively with the different colors.

4. An apparatus according to claim 1, wherein each of said plurality of dial keys includes a ten-key.

5. An apparatus according to claim 1, wherein each of said plurality of display means has a plurality of light generation means, each generating a light of a different color.

6. An apparatus according to claim 3, further comprising selecting means for selecting one of the plurality of external lines in accordance with the operations of said plurality of dial keys.

7. A radio telephone system including exchange means to which a plurality of external lines are connected, comprising:
   radio communication means for communicating a radio signal;
   display means for displaying states of said plurality of external lines on the basis of a radio signal received by said communication means, using characters; and
   selecting means for selecting one of said plurality of external lines,
      wherein said exchange means connects one of said external lines in accordance with the selection by said selecting means, and
      said display means changes displayed characters in accordance with a real-time change of the states of said plurality of external lines.

8. An apparatus according to claim 7, wherein said display means displays a line number specifying one of the plural external lines and the states of the plural external lines, using the characters.

9. An apparatus according to claim 7, wherein said display means displays a called state or a hold state, using the characters.

10. An apparatus according to claim 7, wherein said dial key includes a ten-key.

11. A radio telephone apparatus comprising:
    radio communicating means for transmitting and receiving a radio signal;
    display means for displaying states of a plurality of external lines on the basis of a radio signal received by said radio communicating means, using characters; and
    a dial key,
       wherein said radio communicating means transmits the radio signal in order to select one of the plurality of external lines in accordance with the operation of said dial key, and
       said display means changes displayed characters in accordance with a real-time change of the states of the plurality of external lines.

12. An apparatus according to claim 11, wherein said display means displays a line number specifying one of the plural external lines and the states of the plural external lines, using the characters.

13. An apparatus according to claim 11, wherein said display means displays a called state or a hold state, using the characters.

14. An apparatus according to claim 11, wherein said dial key includes a ten-key.

15. A radio telephone apparatus comprising:
    receiving means for receiving state signals according to a plurality of states of each of a plurality of external lines through a radio line;
    a plurality of dial keys;
    a plurality of display means, each of which is provided in each of said plurality of dial keys, each of said plurality of display means displaying the plurality of states of each of the plurality of external lines, respectively, on the basis of the state signals received by said receiving means; and
    transmitting means for transmitting a selection signal to a select one of said plurality of external lines in accordance with the operation of said dial keys through the radio line,
       wherein said plurality of display means change states outputs in accordance with a real-time change of the display of the plurality of external lines.

16. An apparatus according to claim 15, wherein said display means displays a called state and a busy state respectively with the different colors.

17. An apparatus according to claim 15, wherein said display means displays a hold state and a busy state respectively with the different colors.

18. An apparatus according to claim 15, wherein each of said plurality of dial keys includes a ten-key.

19. An apparatus according to claim 15, wherein each of said plurality of display means has a plurality of light generation means, each generating a light of a different color.

20. A radio communication apparatus comprising:

radio communication means for communicating a radio signal;

discriminating means for discriminating states of plural communication channels;

display means for displaying the states of the plural communication channels discriminated by said discriminating means using characters on the basis of the radio signal received by said radio communication means; and communicating means for communicating via one of the plural communication channels,
wherein said display means changes displayed characters in accordance with a real-time change of the states of the plural communication channels.

21. An apparatus according to claim 20, wherein said communicating means performs speech communication.

22. An apparatus according to claim 20, wherein said communicating means comprises selecting means for selecting one of the plural communication channels.

23. An apparatus according to claim 22, wherein said selecting means includes a dial key for selecting one of the plural communication channels.

24. An apparatus according to claim 23, wherein said dial key includes a ten-key.

25. An apparatus according to claim 20, wherein said display means displays a line number specifying one of the plural communication channels and the states of the plural communication channels, using the characters.

26. An apparatus according to claim 20, wherein said display means displays a called state or a hold state, using the characters.

27. An apparatus according to claim 23, wherein said discriminating means discriminates states of plural telephone lines.

28. A method for controlling a display on a radio communication apparatus, for displaying states of plural communication channels using characters, comprising the steps of:

receiving a radio signal;

discriminating the states of the plural communication channels on the basis of the radio signal; and changing the characters displayed on the display in accordance with a real-time change in the states of the plural communication channels.

29. A method according to claim 28, further comprising the step of selecting one of the plural communication channels.

30. A method according to claim 29, wherein one of the plural communication channels is selected by a dial key.

31. A method according to claim 30, wherein one of the plural communication channels is selected by a ten-key.

32. A method according to claim 28, wherein a line number specifying one of the plural communication channels and the states of the plural communication channels are displayed using the characters.

33. A method according to claim 28, wherein a called state or a hold state is displayed using the characters.

34. A method according to claim 28, wherein states of plural telephone lines are discriminated in said discriminating step.

* * * * *

UNITED STATES PATENT AND TRADEMARK OFFICE
CERTIFICATE OF CORRECTION

PATENT NO. : 5,517,551

DATED : May 14, 1996

INVENTOR : SHUNJI ARAI

It is certified that error appears in the above-identified patent and that said Letters Patent is hereby corrected as shown below:

ON THE TITLE PAGE

[56] REFERENCES CITED

Foreign Patent Documents - insert --1-282990 11/4/89 Japan--; "0233994 12/1983 Japan" should read --0223994 12/1983 Japan--.

COLUMN 1

Line 10, "either" should read --any--;
Line 16, "an" should be deleted.

COLUMN 4

Line 28, "unti" should read --unit--;
Line 34, "(S868). should read --(S869).--;
Line 67, "have" should read -- have been--.

COLUMN 6

Line 66, "a-receiving" should read --a receiving--.

UNITED STATES PATENT AND TRADEMARK OFFICE
CERTIFICATE OF CORRECTION

PATENT NO. : 5,517,551

DATED : May 17, 1996

INVENTOR : SHUNJI ARAI

It is certified that error appears in the above-identified patent and that said Letters Patent is hereby corrected as shown below:

COLUMN 10

Line 1, "(S81i)," should read --(S811),--;
  Line 28, "Unit" should read --unit--.

COLUMN 11

Line 61, "claim 3," should read --claim 1,--.

COLUMN 12

Line 62, "states" should read --display--;
  Line 64, "display" should read --states--.

Signed and Sealed this

Third Day of December, 1996

Attest:

BRUCE LEHMAN

*Attesting Officer*      *Commissioner of Patents and Trademarks*